(12) United States Patent
Conrath

(10) Patent No.: US 8,757,480 B2
(45) Date of Patent: Jun. 24, 2014

(54) METHOD AND APPARATUS OF REDUCING HEAT LOSS AND COOLING LOSS FROM A BANK BUILDING CAUSED BY AUTOMATIC TELLER MACHINES, NIGHT DROP VAULTS, AND CASH DEAL DRAWERS

(76) Inventor: Dale B. Conrath, Indiana, PA (US)

( * ) Notice: Subject to any disclaimer, the term of this patent is extended or adjusted under 35 U.S.C. 154(b) by 0 days.

(21) Appl. No.: 13/592,038

(22) Filed: Aug. 22, 2012

(65) Prior Publication Data

US 2013/0047549 A1    Feb. 28, 2013

Related U.S. Application Data

(60) Provisional application No. 61/526,721, filed on Aug. 24, 2011.

(51) Int. Cl.
*G06F 17/00* (2006.01)

(52) U.S. Cl.
USPC ............................ 235/375; 235/379; 312/236

(58) Field of Classification Search
CPC .......... B65D 5/445; B65D 5/62; B65D 65/22; B65D 81/02; B65D 81/113; B65D 81/1275; B65D 85/38; A44B 18/0069; A44B 18/0049; A44B 18/0076; A44B 19/24; A44B 19/30; A44B 19/34; G06Q 30/02; G06Q 10/087; G06Q 20/341; G06Q 20/1085; G06Q 20/042; G06Q 40/00; G07F 7/1008; G07F 19/20; G06K 17/00
USPC .................... 235/375, 379, 380; 428/99, 100; 150/154, 165; 312/3, 6, 228, 223.1, 312/236; 206/39.3, 39.6, 320, 831; 109/50; 186/37
See application file for complete search history.

(56) References Cited

U.S. PATENT DOCUMENTS

| | | |
|---|---|---|
| 2,705,990 A | 4/1955 | Miller |
| 2,707,620 A | 5/1955 | Snyder |
| 3,589,971 A | 6/1971 | Reed |
| 4,244,411 A | 1/1981 | Karlstrom |
| 4,393,788 A | 7/1983 | Campbell et al. |
| 4,620,396 A | 11/1986 | Bjorntwedt |
| 4,745,769 A | 5/1988 | Wooden, Jr. |
| 4,755,313 A | 7/1988 | Wahl et al. |
| 4,798,220 A | 1/1989 | Smoljo |
| 4,856,436 A | 8/1989 | Campbell |
| 4,932,524 A | 6/1990 | Hodson |
| 4,954,384 A | 9/1990 | Hartwell |
| 5,226,521 A | 7/1993 | Oden |
| D344,410 S | 2/1994 | Oden |
| 5,388,702 A | 2/1995 | Jones |
| 6,364,099 B2 * | 4/2002 | Emoff et al. ................. 206/39.3 |
| 6,543,864 B2 | 4/2003 | Cline |
| 8,039,080 B2 | 10/2011 | Leonard et al. |
| 2005/0189247 A1 | 9/2005 | Traugh |
| 2007/0289682 A1 | 12/2007 | Young |
| 2009/0008005 A1 | 1/2009 | Chu |

* cited by examiner

*Primary Examiner* — Daniel Hess
*Assistant Examiner* — Tabitha Chedekel
(74) *Attorney, Agent, or Firm* — Nils H. Ljungman & Associates

(57) ABSTRACT

A method and apparatus of reducing heat loss and cooling loss from a bank building caused by automatic teller machines, night drop vaults, and cash deal drawers.

20 Claims, 20 Drawing Sheets

Automatic Teller Machine

Automatic Teller Machine Front Panel

METHOD AND APPARATUS OF REDUCING HEAT LOSS AND COOLING LOSS FROM A BANK BUILDING CAUSED BY AUTOMATIC TELLER MACHINES, NIGHT DROP VAULTS, AND CASH DEAL DRAWERS

CONTINUING APPLICATION DATA

This application claims priority to U.S. Provisional Patent Application No. 61/526,721, filed on Aug. 24, 2011.

BACKGROUND

1. Technical Field

The present application relates to a method and apparatus of reducing heat loss and cooling loss from a bank building caused by automatic teller machines, night drop vaults, and cash deal drawers.

2. Background Information

Background information is for informational purposes only and does not necessarily admit that subsequently mentioned information and publications are prior art.

Automatic Teller Machines (a.k.a. ATMs) and Night Drop Vaults and Cash Deal Drawers are made from steel. Metals conduct heat, cold, and electricity. These pieces of equipment in the bank cause heat and cooling loss. In turn the heat and cooling loss causes the furnace or air conditioning to run more often trying to maintain room temperature, as to the setpoint on the thermostat. There are dramatic losses twenty-four hours a day, seven days a week. This is a waste of our Natural Resources and energy that could be cut up to or by about one-third by covering these machines.

Stopping or reducing the heat loss would also help with employees becoming cold and maybe prevent them from becoming sick or making their working conditions worse. This in turn could help save money on Insurance costs and loss or employee production and employee production and employee sick days.

Cash deal drawers may also be known as deal drawers and transaction drawers and teller drawers. A cash deal drawer may be used in a drive-through setting at a bank, pharmacy, or other similar location in which a driver pulls a vehicle up to a site outside and away from the bank, pharmacy, or other similar location. The driver may place an object into a device that is configured to transport the object from the device to the inside of the bank, pharmacy, or other drive-through location. An employee of the bank, pharmacy, or other drive-through location may also use the cash deal drawer to transport an object, including money, to a customer at a site outside and away from the bank, pharmacy, or other drive-through location. The employee may leave the cash deal drawer in a closed position when not in use, and may open the cash deal drawer into a second, open position during use of the cash deal drawer.

OBJECT OR OBJECTS

An object of the present application may be to reduce and/or minimize heat or cold loss or cooling loss, through thermal conduction, in a bank by providing means to insulate an automatic teller machine (ATM) and/or a night drop vault and/or a cash deal drawers.

SUMMARY

An embodiment for covering automatic teller machines, night drop vaults, cash deal drawers, etc., was designed to reduce heating and cooling losses, through thermal conduction.

The covers will secure the privacy of the ATMs, Night Drop Vaults, and Cash Deal Drawers taking them out of sight from the general public. At least one possible embodiment of a cover of the present application may be configured to hide an automatic teller machine and/or a night drop vault and/or a cash deal drawer from view of bank customers.

These covers could be heated by Solar Power, Electric, or no heat applications at all. The purchasers of the cover will decide if they want to heat the cover or not.

In at least one possible embodiment of the present application, the cover may comprise a cover, a security cover, a jacket, a security jacket, a wrap, a security wrap, a tarp, a security tarp, a surround, a security surround a blanket, a security blanket, a tent, a security tent, a shade, and/or a security shade.

In at least one possible embodiment of the present application, a cover may be manufactured in different layers, for example, a single, a double, or a triple layer.

The insulation of the cover, the inner cover, and/or the outer cover may possibly be held together by sewing, for example, single, double, triple, and quadruple stitching by using fabric, polymer, or metal threads. The insulation of the cover, the inner cover, and/or the outer cover may also possibly be held together by fabric adhesives, industrial adhesives, spiral binding with metal or plastic spiral coils, metal stitching, for example single, double, triple, and quadruple stitching. The insulation of the cover, the inner cover, and/or the outer cover may also possibly be held together by hook and loop fasteners such as Velcro, plastic or metal zippers, sewn in pockets to hold insulation in place, rather than sewing or glueing or any other means deemed usable, grommets, and any types of heat fusion. Other means may be utilized or adapted for use to hold together the insulation, inner cover, and/or outer cover.

In at least one possible embodiment of a cover of the present application, the cover may possibly comprise a cover formed from plastic, a cover formed from plastic, carbon fiber materials, polymers, aluminum, cold rolled steels, vinyls, cotton fabrics, other types of fabrics, polyester materials, stainless steel (any and all grades), woods (any and all types), and polyethylene. The cover may also comprise other materials.

In at least one possible embodiment of a cover of the present application, the cover may comprise an outer fabric layer made of polyester. In at least one possible embodiment of a cover of the present application, the cover may comprise an outer fabric layer made of 1000 denier nylon. In at least one possible embodiment of the present application, the cover may comprise an outer fabric layer made of high bulk textured nylon. In at least one possible embodiment of a cover of the present application, the cover may comprise an outer fabric layer made with a urethane coating. In at least one possible embodiment of a cover of the present application, the cover may comprise an outer fabric layer wherein the finish is dyed and/or durable water repellent and/or comprising a textured weave.

In at least one possible embodiment of a cover of the present application, the cover may comprise an outer fabric layer, wherein the fabric construction specifications include at least one of the following features: 34 warp, 26 fill, total weight of 8.80 oz./sq yd, coating add on of 1.00 oz/sq yd, surface abrasion ASTM D 3884-01 (H-18 wheels, 1000 g load), no cycles passed 2,750, breaking strength (lbf) ASTM D 5034-90 (grab), warp 380, Fill 262.7, tearing strength (lbf), ASTM D 2261-96, warp 23.9, and fill 22.1

In at least one possible embodiment of a cover of the present application, the cover may possibly comprise an inner liner, wherein the inner liner comprises at least one of the following features: energy shield 200, 10 oz weight, base fabric polyester, and embossing taffeta. In at least one possible embodiment of a cover of the present application, the cover may possibly comprise an inner liner, wherein the inner liner comprises at least one of the following features: hydrostatic resistance: 159, adhesion: 20 lbs/2 inch, tear strength: 23 warp×22 fill, tensile strength: 109 warp×95 fill, flame resistance: warp×fill, after flame 0 sec.×1 sec., char length 5.3 inches×4.8 inches, r value (fabric only)0.770, and U value (fabric only) 1.229.

In at least one possible embodiment of a cover of the present application, the cover may possibly comprise metals, fiberglass, polymers, plastics, and anything else on which could be vacuum formed in molds or liquid poured into molds to form a one piece outer and inner shell coverings. Other ways to produce one piece covers may include to use commercial spray guns into molds.

Fabrics that are on the material list would be cut out by machines and hand tools that are designed for such applications. The pieces could then be put together by sewing, glueing, velcro, buttons, snaps, zippers, or any other type of fusion.

Wood would need to be cut and shaped, then screwed, glued, nailed, and any other means to fuse the materials together.

Some examples of insulations that could be used to insulate the covers may include matte/safe touch, fiberglass, aerospace insulation, Styrofoams, newspaper, cotton, foam padding, polymers, recycled papers, cardboard, and wood. Other examples of insulations may include blow in insulations/Styrofoams, recycled paper, fiberglass, cotton, cardboard, wood, aerospace insulations, shredded newspaper, polymers. Any and all of the materials could be used as insulation for cover manufacturing. Some of these materials would not have a great insulation factor to be deemed usable. Other examples of insulations may include gases used for insulation factors. For example, a two-piece-construction of a polymer or metal application for manufacturing. It then would be injected after the outer and inner pieces are fused together to form an air-tight chamber.

In at least one possible embodiment of a cover of the present application, the cover may possibly comprise insulation, wherein the insulation is 6 inch thick polyester bonded fiber insulation. In at least one possible embodiment of a cover of the present application, the cover may possibly comprise insulation, wherein the insulation is compressed to 1 inch thick and/or 15 oz/yd.

In at least one possible embodiment of the present application, heating sources may include solar thermal, electrical, gas forced air, gas hot water boiler, geothermal, coal, wind generator, hydro-electric, oil furnace/hot water boiler, electric generator, battery powered, solar photovoltaic, hydropower, coal methane, waste coal, municipal solid waste, wood and wood pulp, used motor oil burners, furnaces, forced air, hot water, nuclear. Any of these heating sources could be used to heat the covers. Some of the heat sources are not cost effective to produce, but still could be used in order to save energy.

In at least one possible embodiment of the present application, ATM, night drop vault, and cash deal drawer covers may be attached to the walls or surroundings by means of: Velcro, snaps, zippers (any and all types), eyelets, screws (any and all types), nails (any and all types), glues (any and all types), construction adhesives, channels (for covers to slide into), grommets, and/or welded. In addition, any other type of fusion methods used in metal applications may be used to attach covers of the present application to automatic teller machines and/or night drop vaults and/or cash deal drawers and/or depositories.

In at least one possible embodiment of a cover of the present application, the cover may possibly comprise at least one zipper; wherein the zipper is a 2 inch zipper with ⅝ inch chain, and 20 teeth per inch.

In at least one possible embodiment of a cover of the present application, the cover may possibly comprise hook and loop tape with at least one of the following properties: totally or substantially washable and dry-cleanable, with a max shrinkage of 2%; highly resistant to cold (−30 degrees C.) and heat (softing point of 180 degrees C., melting point 210 degrees C. to 250 degrees C.); good electric insulation and absolutely or substantially moth-proof; strong acid and alkaline resisting; woven by 100% nylon filament and coated with special resin on the back of tapes; soft, lightweight, flexible, and cleanable; extremely or substantially endurable, repeated uses of over 20,000 times; without or substantially without the defects of rusting, bitting, breaking, raveling; simple and convenient operation, time saving; entirely or substantially free fastening position and adjustable tape length; can be cut to any or essentially any length or into any or essentially any shape desired; and providing easy sewing, adhesive coating, stapling, high frequency welding or other processings.

In at least one possible embodiment of a cover of the present application, the cover may possibly comprise hook and loop tape with the following characteristics with regards to durability: peeling cycle of 2,000 times results in a closure strength reducing rate of under 15% and no fluffing or essentially no fluffing on the loop tape; peeling cycle of 5,000 times results in a closure strength reducing rate of under 25% and little fluffing on the loop tape; peeling cycle of 10,000 times results in a closure strength reducing rate of under 35% and obvious fluffing on the loop tape; peeling cycle of 20,000 times results in a closure strength reducing rate of under 50% and fluffing throughout the loop tape.

In at least one possible embodiment of a cover of the present application, the cover may possibly comprise hook and loop tape with the following characteristics with regards to color fastness: in a test method of JIS-L-0844-1976A-4 in testing against washing, the result is Class 3 or superior; in a test method of JIS-L-0845-1975-3 in testing against hot water, the result is Class 3 or superior; in a test method of JIS-L-0848-1974-A in testing against sweat, the result is Class 3 or superior; and in a test method of WS-L-0849-1971 in testing against rubbing, the result is Class 3 or superior.

In at least one possible embodiment of a cover of the present application, the cover may possibly comprise hook and loop tape with the following characteristics with regards to standard packaging: a width of ⅜ inch has sewing quality of 1500 yards and pressure sensitive 1200 yards; a width of ¾ inch has sewing quality of 1250 yards and pressure sensitive 1000 yards; a width of 1 inch has sewing quality of 1000 yards and pressure sensitive 900 yards; a width of 1½ inch has sewing quality of 700 yards and pressure sensitive 600 yards; a width of 2 inches has sewing quality of 500 yards and pressure sensitive 400 yards; and a width of 4 inches has sewing quality of 250 yards and pressure sensitive 250 yards.

In at least one possible embodiment of a cover of the present application, the cover may possibly comprise hook and loop tape with the following characteristics with regards to strength: a width of ⅝ inch has shear strength of over 5.3 KG and peel strength of over 130 GM; a width of ¾ inch has shear strength of over 7.5 KG and peel strength of over 180 GM; a width of 1 inch has shear strength of over 10.0 KG and peel strength of over 250 GM; a width of 1½ inches has shear strength of over 15.0 KG and peel strength of over 360 GM; a width of 2 inches has shear strength of over 18.0 KG and peel strength of over 440 GM; and a width of 4 inches has shear strength of over 35.0 KG and peel strength of over 840 GM.

In one possible embodiment of the present application, a cover could be placed directly on a machine and/or a vault and/or a cash deal drawer. In another possible embodiment, a frame could be fabricated to surround an ATM and/or a vault and/or a cash deal drawer without direct contact with the actual machines, so that the cover may then be attached to the frame. Frames according to the present application may be fabricated from: plastics, fiberglass, carbon fibers, polymers, aluminum, cold rolled steels, hot rolled steels, titanium, stainless steel, and/or wood. Any of the materials on this list could be used to fabricate a frame to put around the ATMs and Night Drop Vaults and Cash Deal Drawers. Some of the materials used to make the frames would not be cost effective to use, but it is possible to use them to make the custom frames. Other materials may be used to fabricate frames.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
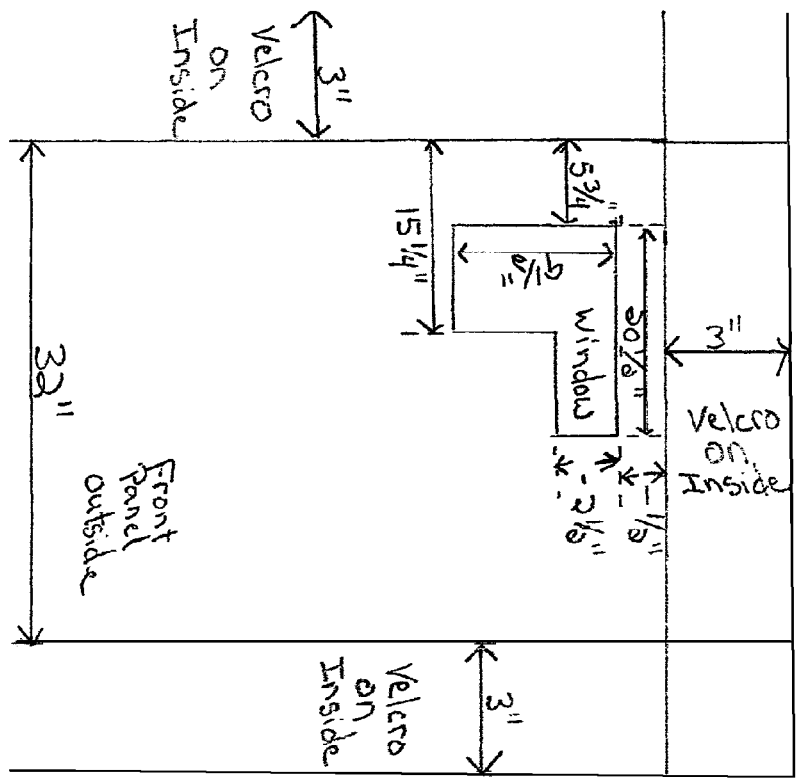
FIG. 1 is a drawing of one possible embodiment of a cover of the present application for an automatic teller machine (ATM)

FIG. 1 shows a drawing of possible dimensions for at least one possible embodiment of a cover of the present application configured to cover and/or insulate the side of an automatic teller machine facing the inside of the bank. The cover is configured to cover and/or insulate the portions of an automatic teller machine inside a bank to prevent, minimize, and/or restrict the transfer or heat and/or cold from the automatic teller machine to the ambient air inside the bank. In the embodiment illustrated in FIG. 1, the cover comprises a front panel, two side panels, and a top panel. The front panel comprises a window configured to display the screen of the automatic teller machine as well as to permit air to flow through the vent of the automatic teller machine, for example so that the automatic teller machine may not overheat.

Figure 2:
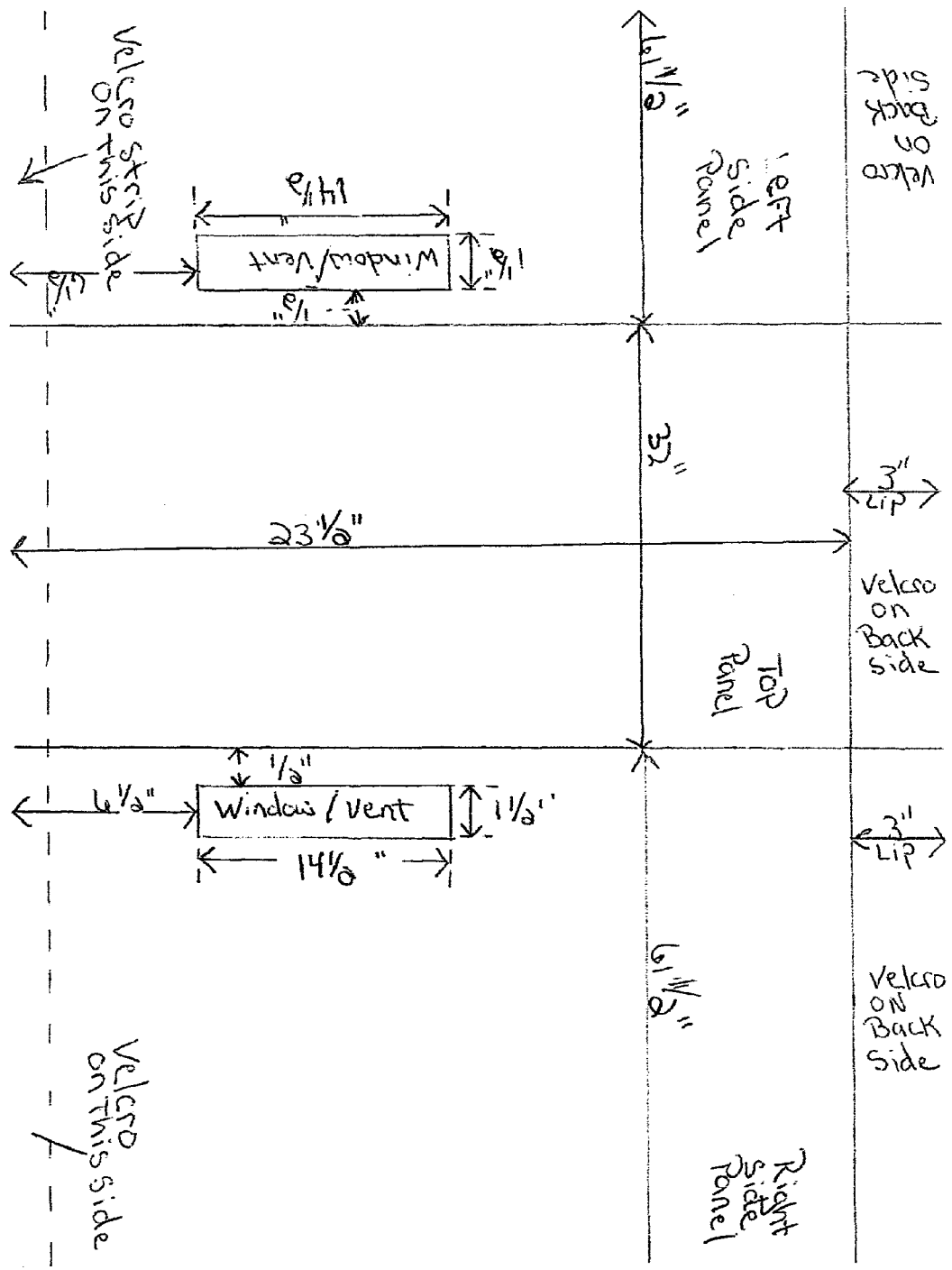
FIG. 2 is a drawing of one possible embodiment of a cover of the present application.

FIG. 2 shows a drawing of possible dimensions for another possible embodiment of a cover of the present application. The cover of FIG. 2 comprises windows/vents, a left side panel, a right side panel, a top panel, a lip portion, and hook and loop fasteners such as Velcro.

Figure 3:
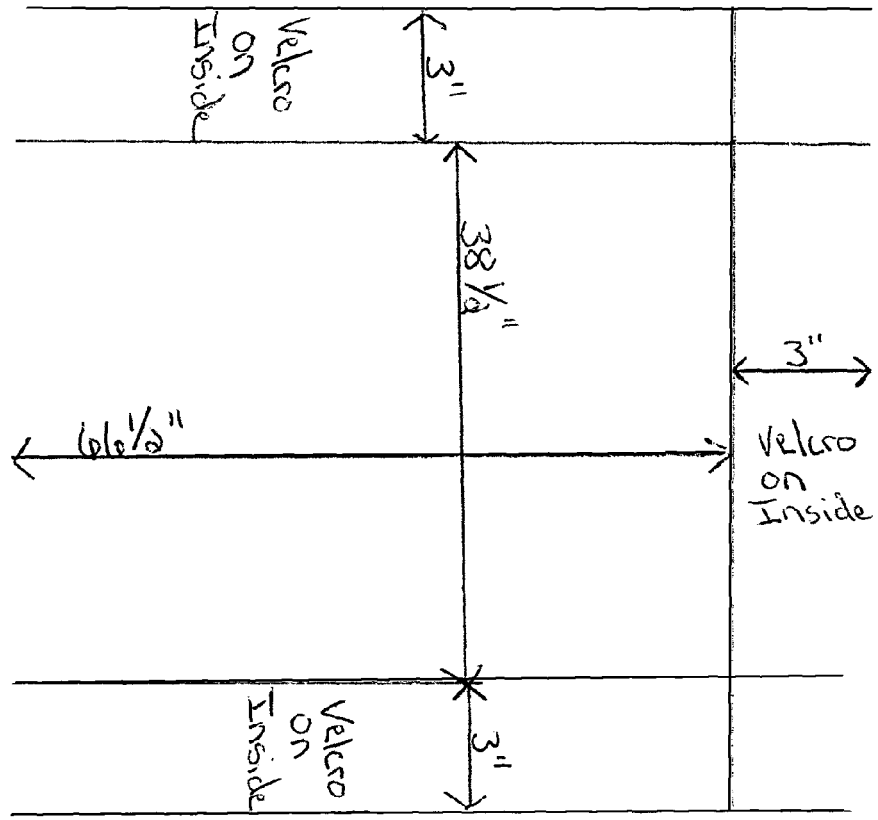
FIG. 3 is a drawing of one possible embodiment of a cover of the present application for a night drop vault.

FIG. 3 shows a drawing of possible dimensions of at least one possible embodiment of a cover of the present application configured to cover and/or insulate the side of a night drop vault facing the inside of the bank.

Figure 4:
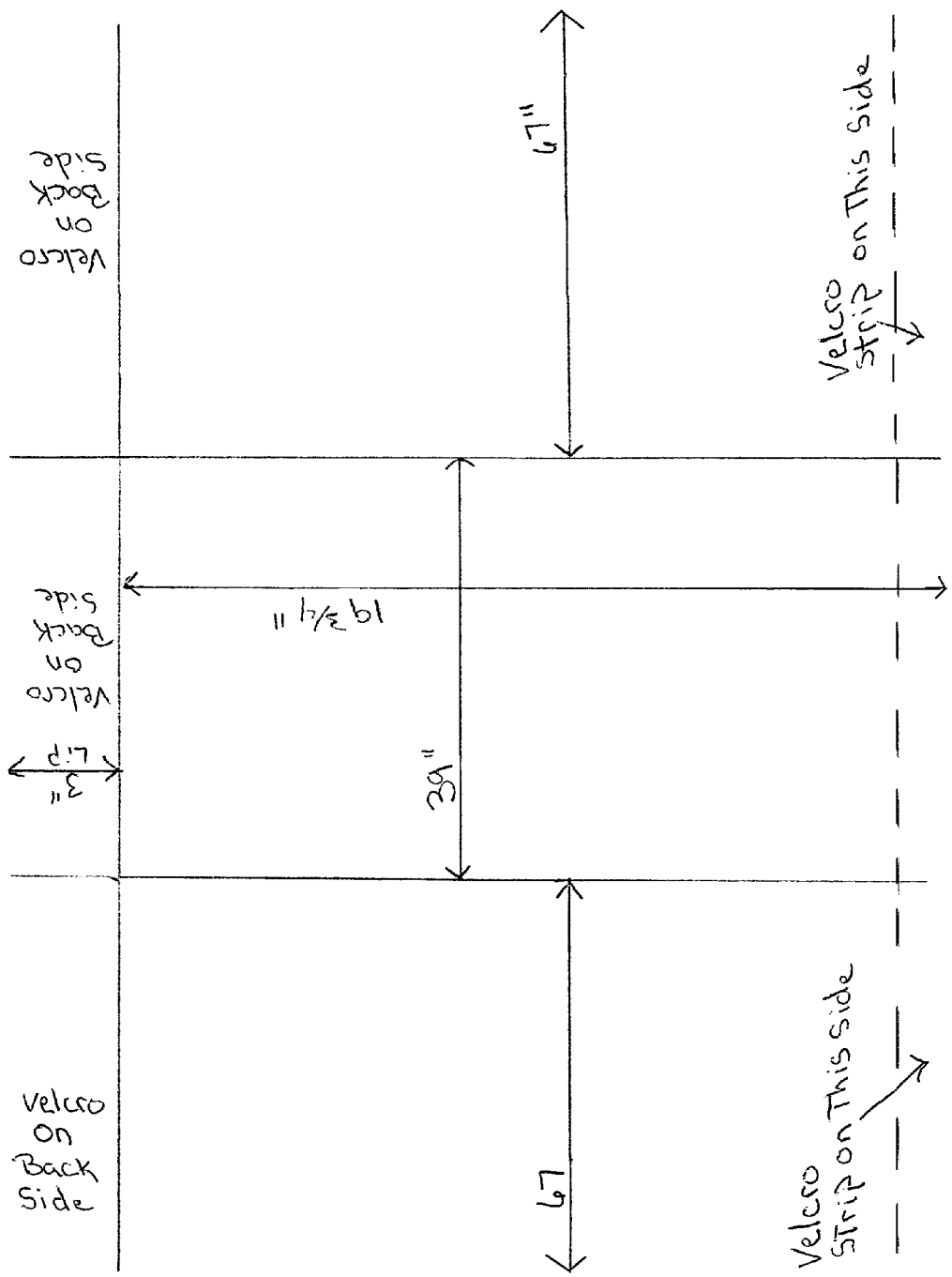
FIG. 4 is a drawing of one possible embodiment of a cover of the present application.

FIG. 4 shows a drawing of possible dimensions of another possible embodiment of a cover of the present application configured to cover and/or insulate the side of a night drop vault facing the inside of the bank.

Figure 5:
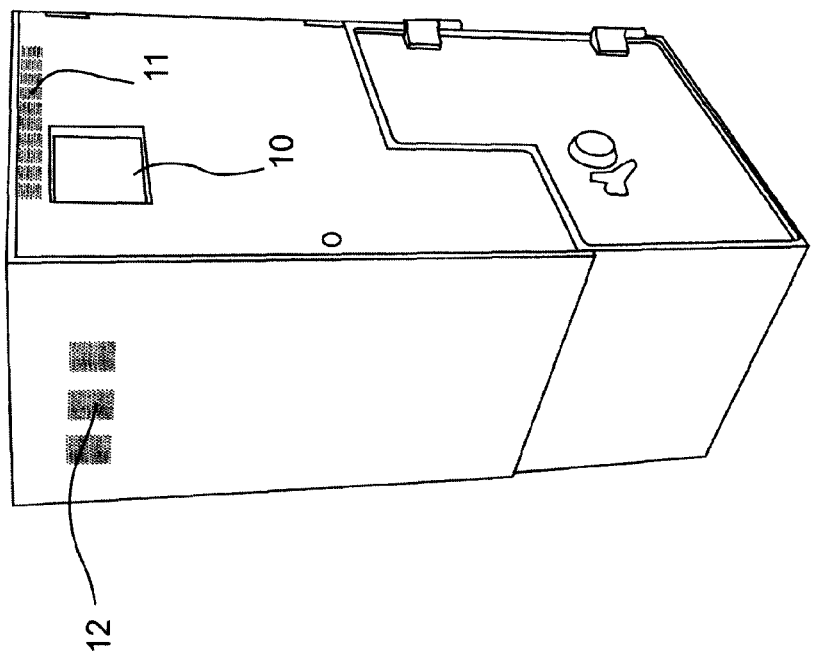
FIG. 5 is a photograph of the side of an automatic teller machine facing the inside of the bank.
Figure 6:
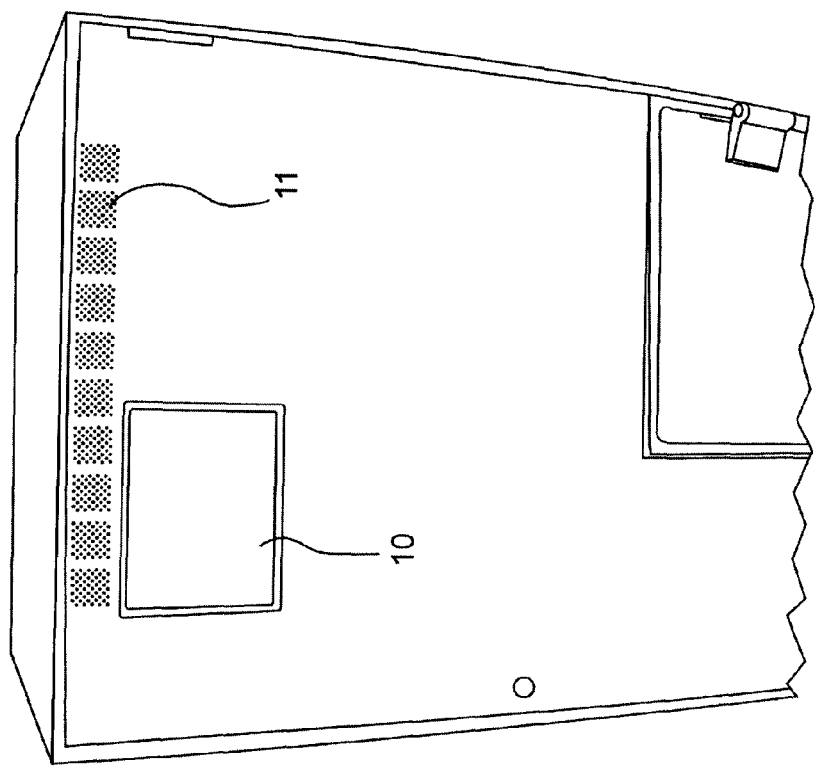
FIG. 6 is a photograph of another angle of the side of an automatic teller machine facing the inside of the bank.

FIGS. 5 through 6 are photographs of the side of an automatic teller machine facing the inside of the bank, which may be used in conjunction with one possible embodiment of a cover of the present application. FIG. 5 shows a screen 10, a first vent 11, and a second vent 12. FIG. 6 shows the screen 10 and the first vent 11.

Figure 7:
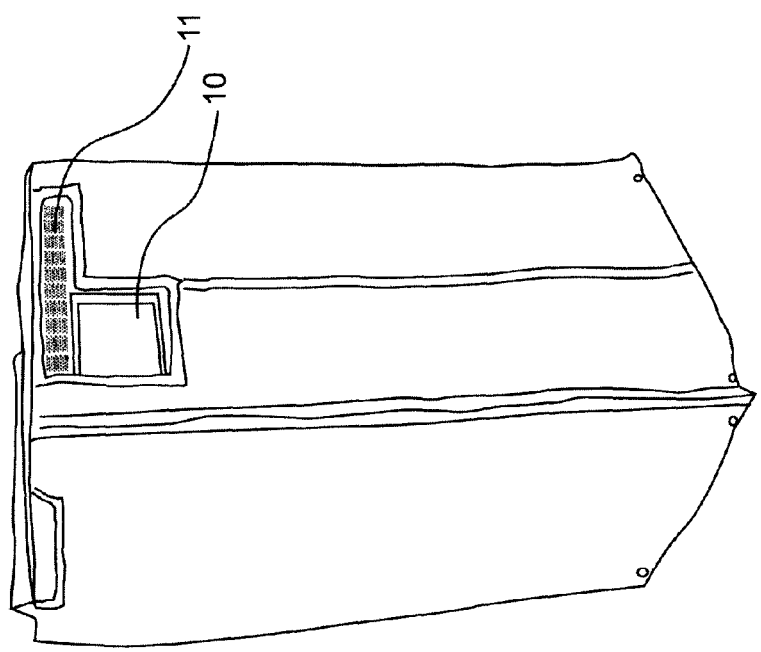
FIG. 7 is a photograph of the side of an automatic teller machine facing the inside of the bank with one possible embodiment of a cover of the present application disposed thereon.

FIG. 7 is a photograph of the side of an automatic teller machine facing the inside of the bank with one possible embodiment of a cover of the present application disposed thereon. The cover comprises windows and/or vents to allow a bank employee to see the screen of the automatic teller machine as well as to permit air to flow through to the vents of the automatic teller machines. The cover may insulate the automatic teller machine to restrict and/or minimize the transfer of heat and/or cold into the bank. FIG. 7 shows the screen 10 and vents 11 and 12 of the automatic teller machine, which are visible through the windows of the cover.

Figure 8:
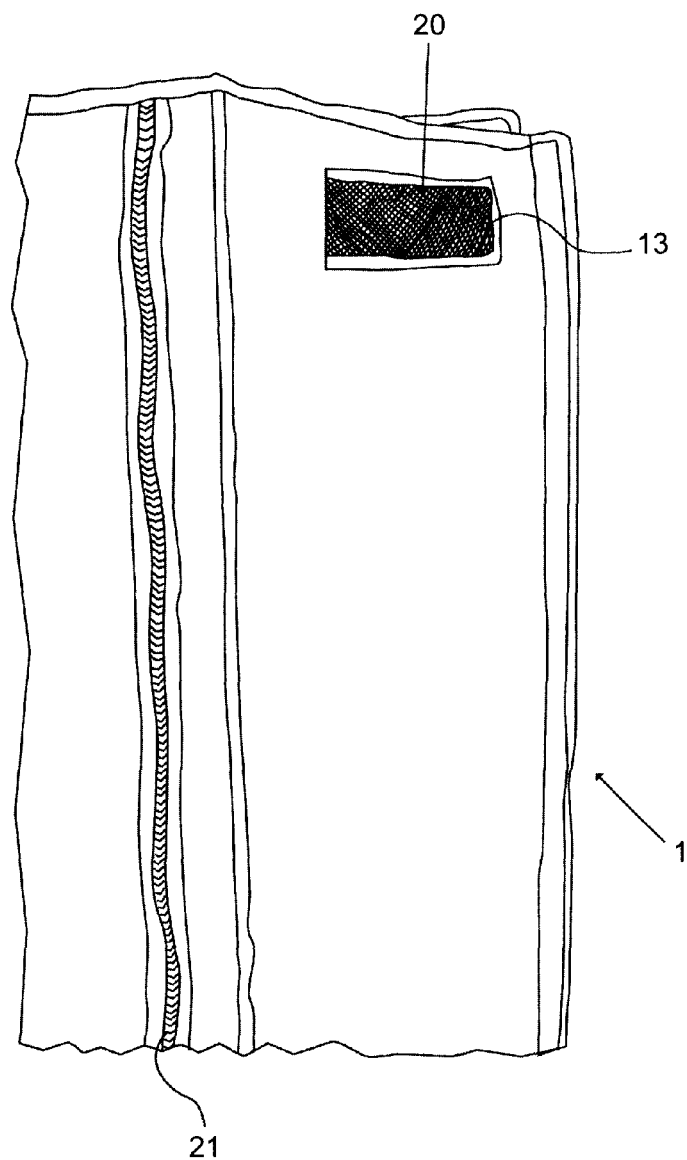
FIG. 8 is a photograph of an automatic teller machine with a cover according to one possible embodiment of the present application disposed thereon.

FIG. 8 is a photograph of the side of an automatic teller machine facing the inside of the bank. A cover 1 according to at least one possible embodiment of the present application is essentially completely or essentially fully disposed on the ATM inside the bank. The cover 1 comprises a zipper 21 and a vent window 20. The vent window 20 is configured to permit air to flow through the vent 13 of the ATM.

Figure 9:
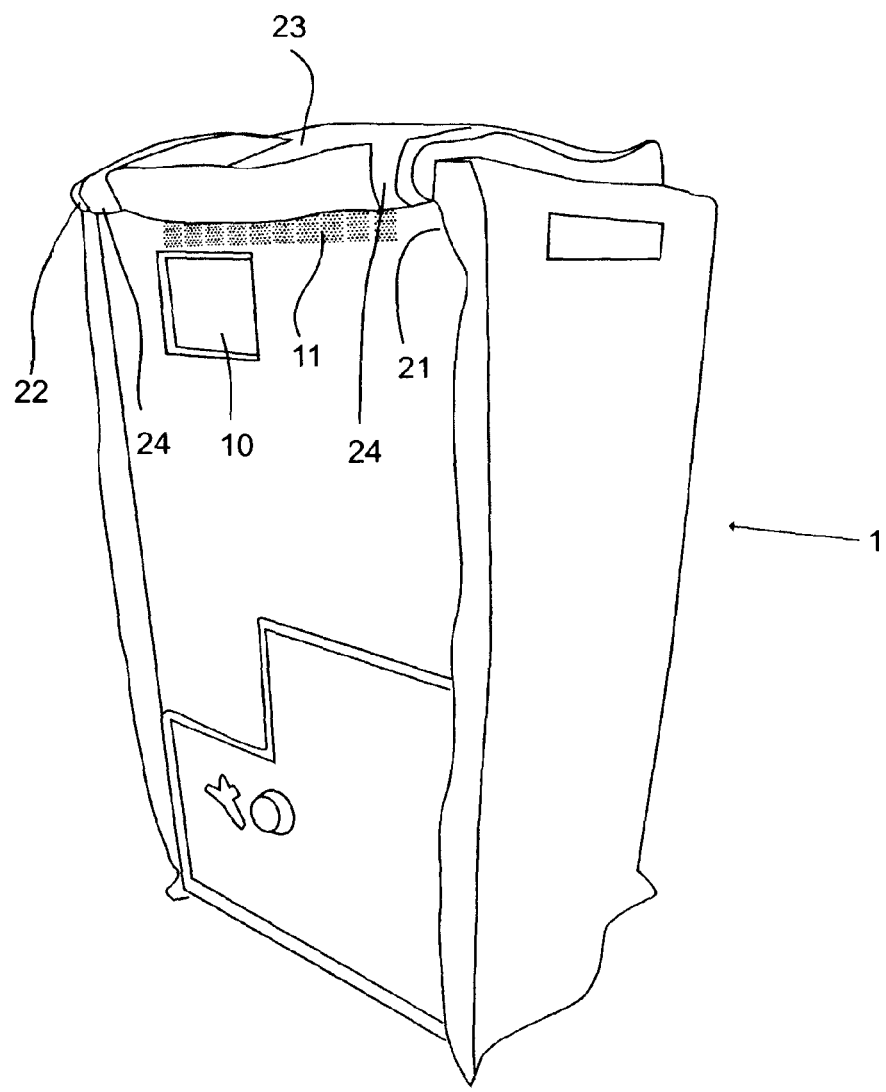
FIG. 9 is a photograph of an automatic teller machine with a cover according to one possible embodiment of the present application partially disposed thereon.

FIG. 9 is a photograph of a cover 1 partially disposed on the side of an automatic teller machine 2 which is facing the inside of a bank. The cover comprises zippers 21 and 22 and a flap 23. The zippers 21 and 22 have been disengaged, which permits the flap 23 to be lifted away from the ATM to reveal the ATM 2 underneath the cover 1. Once the flap 23 of the cover 1 is lifted, the flap 23 may be set on top of the ATM 2 in order to allow a bank employee to access the ATM 2, such as to access the keypad and handle of the ATM and/or open and close the safe portion of the ATM. The cover 1 also comprises stripes 24. The flap 23 also comprises insulation.

Figure 10:
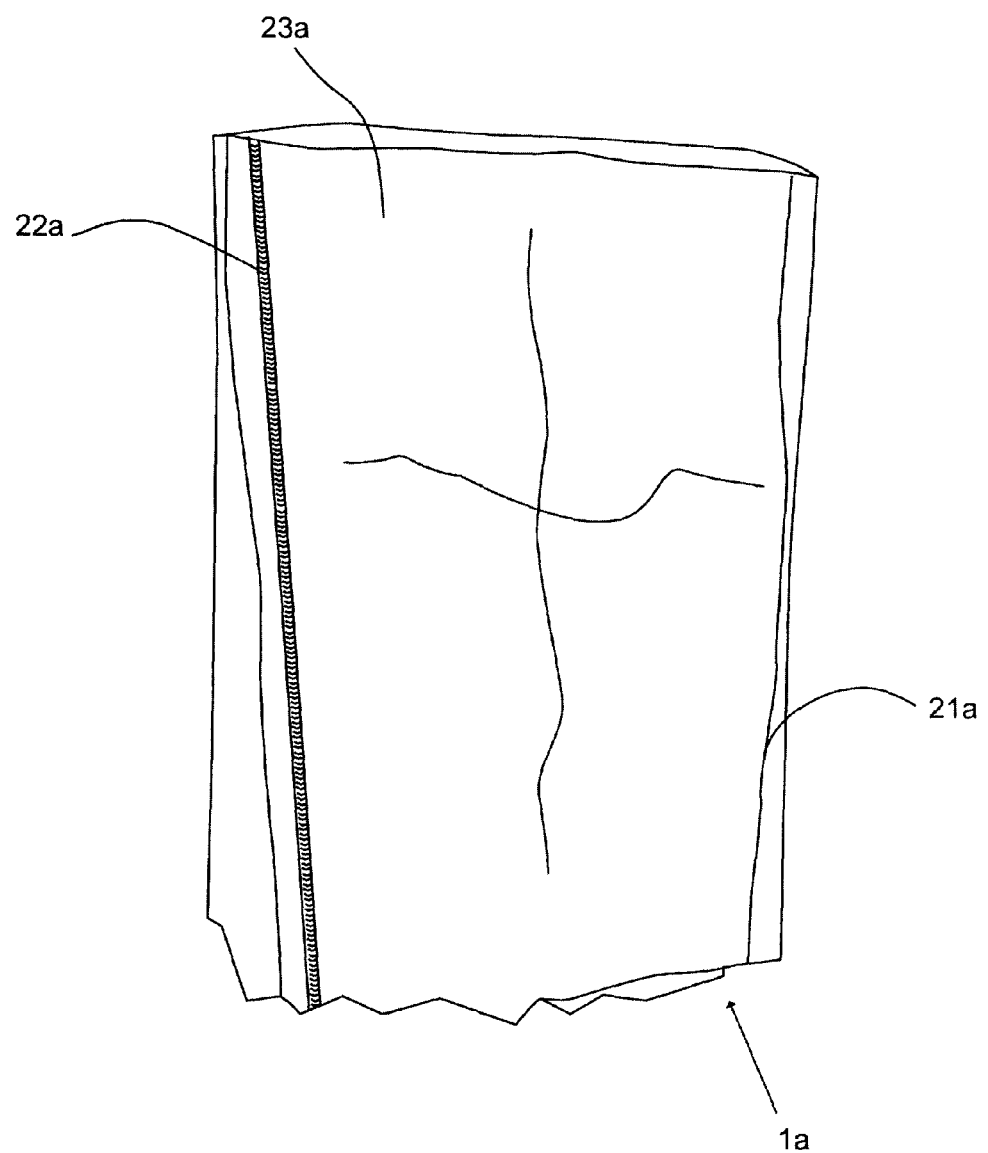
FIG. 10 is a photograph of a night drop vault with a cover according to one possible embodiment of the present application disposed thereon.

FIG. 10 is a photograph of the side of a night drop vault facing the inside of a bank. A cover 1a according to one possible embodiment of the present application is essentially fully disposed over the night drop vault. The cover 1a comprises zippers 21a and 22a and a flap 23a.

Figure 11:
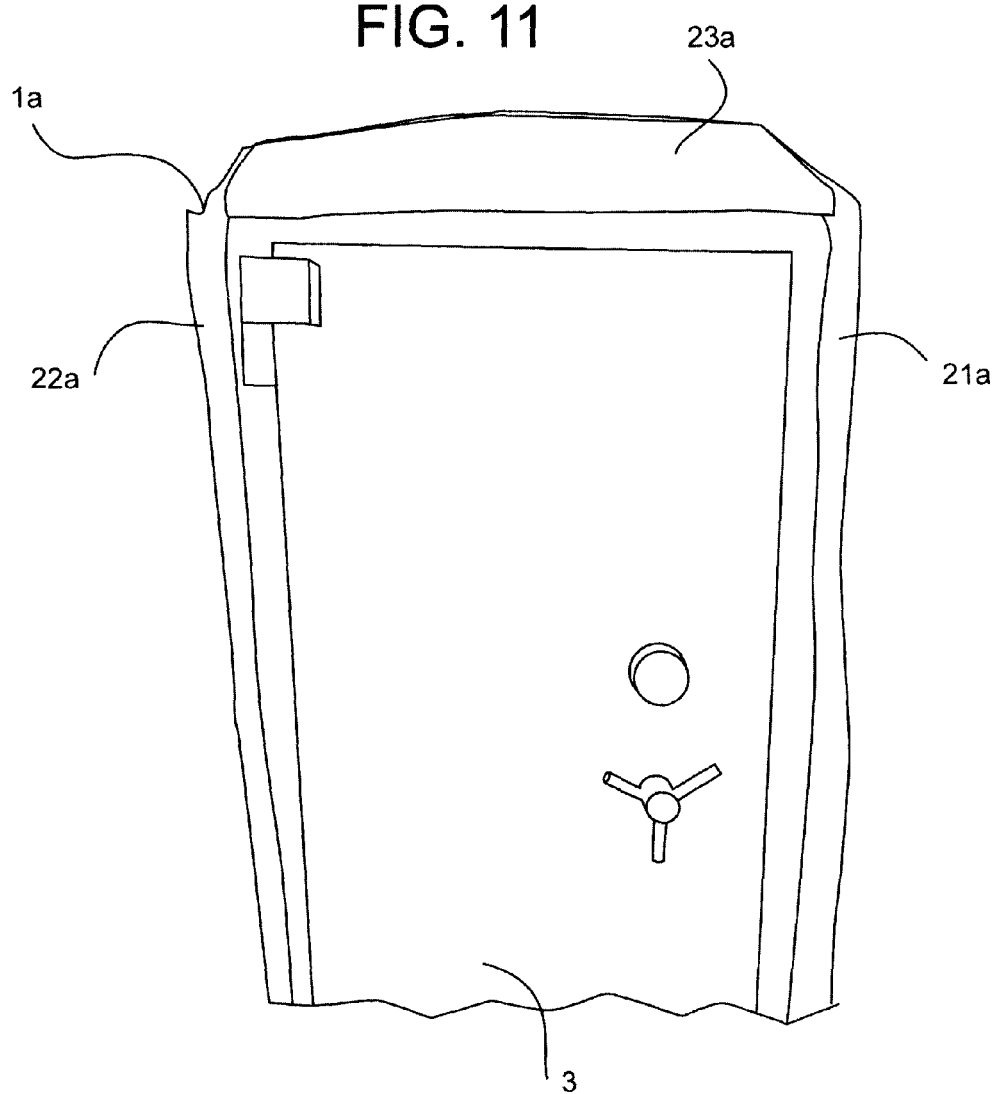
FIG. 11 is a photograph of a night drop vault with a cover according to one possible embodiment of the present application partially disposed thereon.

FIG. 11 is a photograph of a cover 1a disposed over a night drop vault 3. The zippers 21a and 22a have been disengaged, which permits the flap 23 to be lifted out of place to reveal the night drop vault 3 underneath the cover 1a. Once the flap 23a of the cover 1a is lifted, the flap 23a may be set on top of the night drop vault 3 in order to allow a bank employee to access the night drop vault 3, such as to access the keypad and the handle of the night drop vault 3. The flap 23a also comprises insulation.

Figure 12:
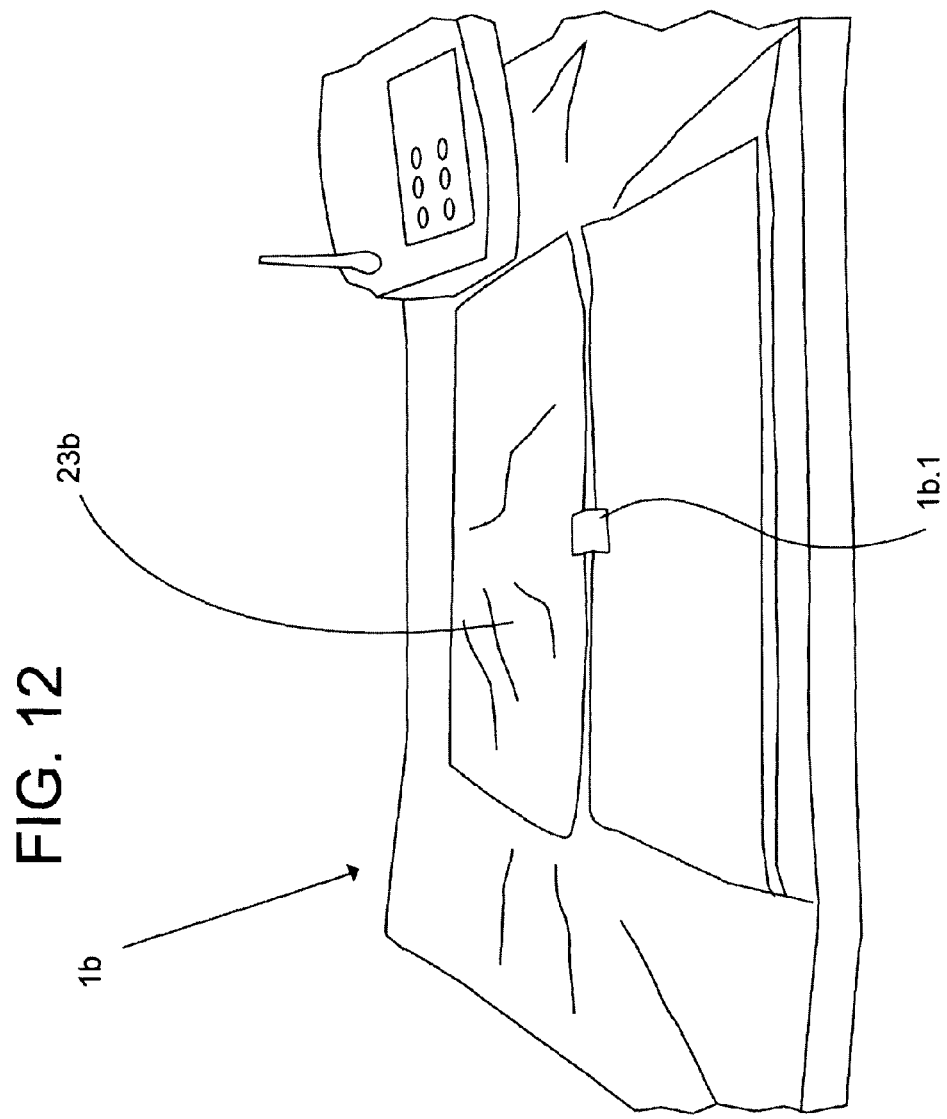
FIG. 12 is a photograph of a cash deal drawer with a cover according to one possible embodiment of the present application disposed thereon and the cash deal drawer closed inside the bank.

FIG. 12 is a photograph of a cover 1b disposed over a cash deal drawer. The cover 1b comprises a flap 23b and hook and loop fasteners 25b and 26b, not shown. The flap 23b is closed as seen in FIG. 12. The flap 23b of the cover 1b comprises a tab 1b.1, which is configured and disposed to permit an employee to grasp the tab 1b.1 and lift the flap 23b away from the cover 1b as well as the cash deal drawer, in order to permit the employee to access the cash deal drawer and make a transaction with a customer. The flap 23b may be lifted when an employee is using the cash deal drawer or teller drawer.

Figure 13:
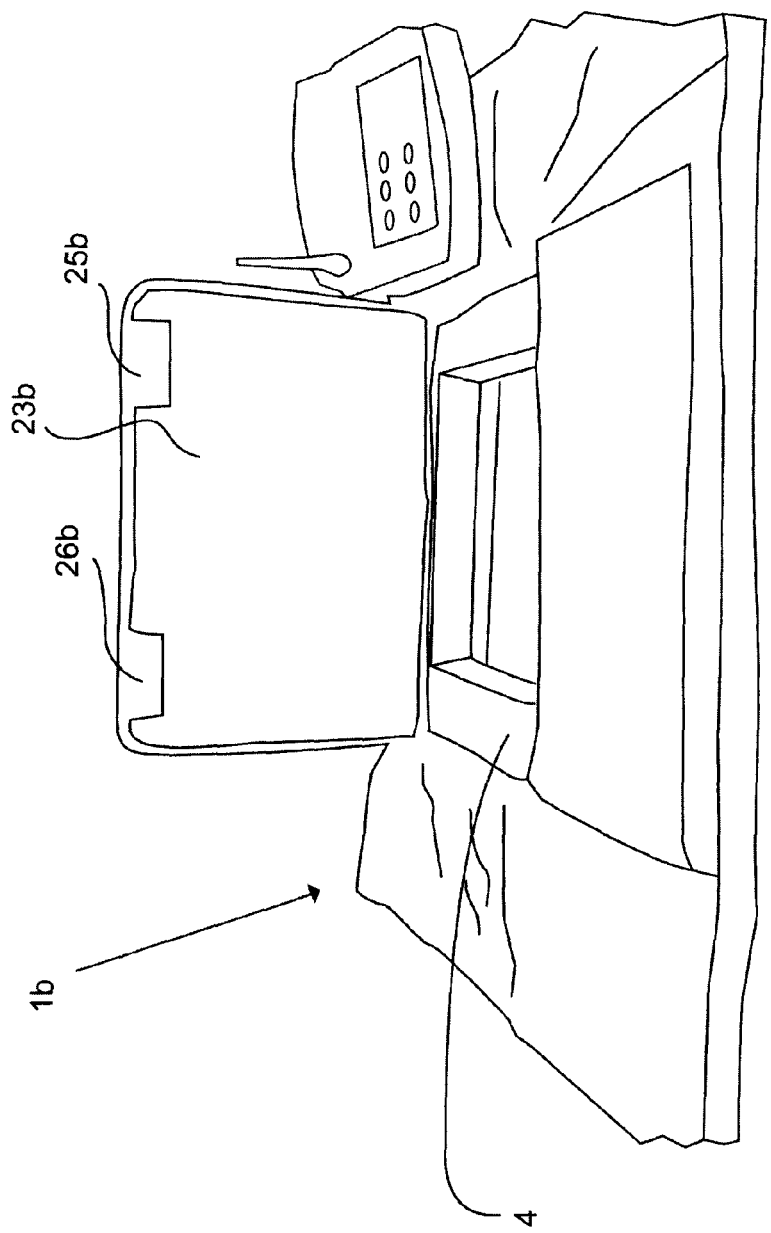
FIG. 13 is a photograph of a cash deal drawer with a cover according to one possible embodiment of the present application disposed thereon and the cash deal drawer opened inside the bank.

FIG. 13 is a photograph of a cover 1b disposed over a cash deal drawer 4. The flap 23b is in the open position, revealing the cash deal drawer 4. The flap 23b comprises the hoop and loop fasteners 25b and 26b.

Figure 14:
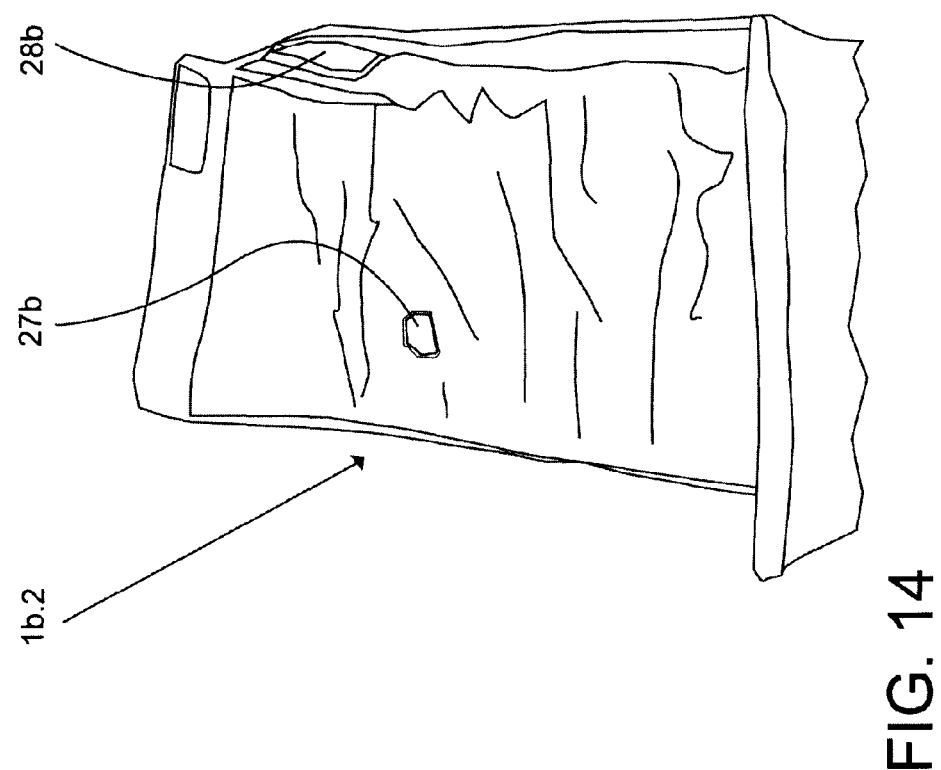
FIG. 14 is a photograph of a portion of a cover configured to insulate a portion of a cash deal drawer.

FIG. 14 is a photograph of portion 1b.1 of a cover 1b configured to insulate a portion of a cash deal drawer. The portion 1b.1 comprises a hole 27b and a window 28b. The hole 27b is configured to permit wiring and/or electrical cords to be run through the cover 1b and/or portion of the cover 1b.1 and thus be connected to the cash deal drawer. The window 28b is configured to permit personnel to access the operating switches of the cash deal drawer.

Figure 15:
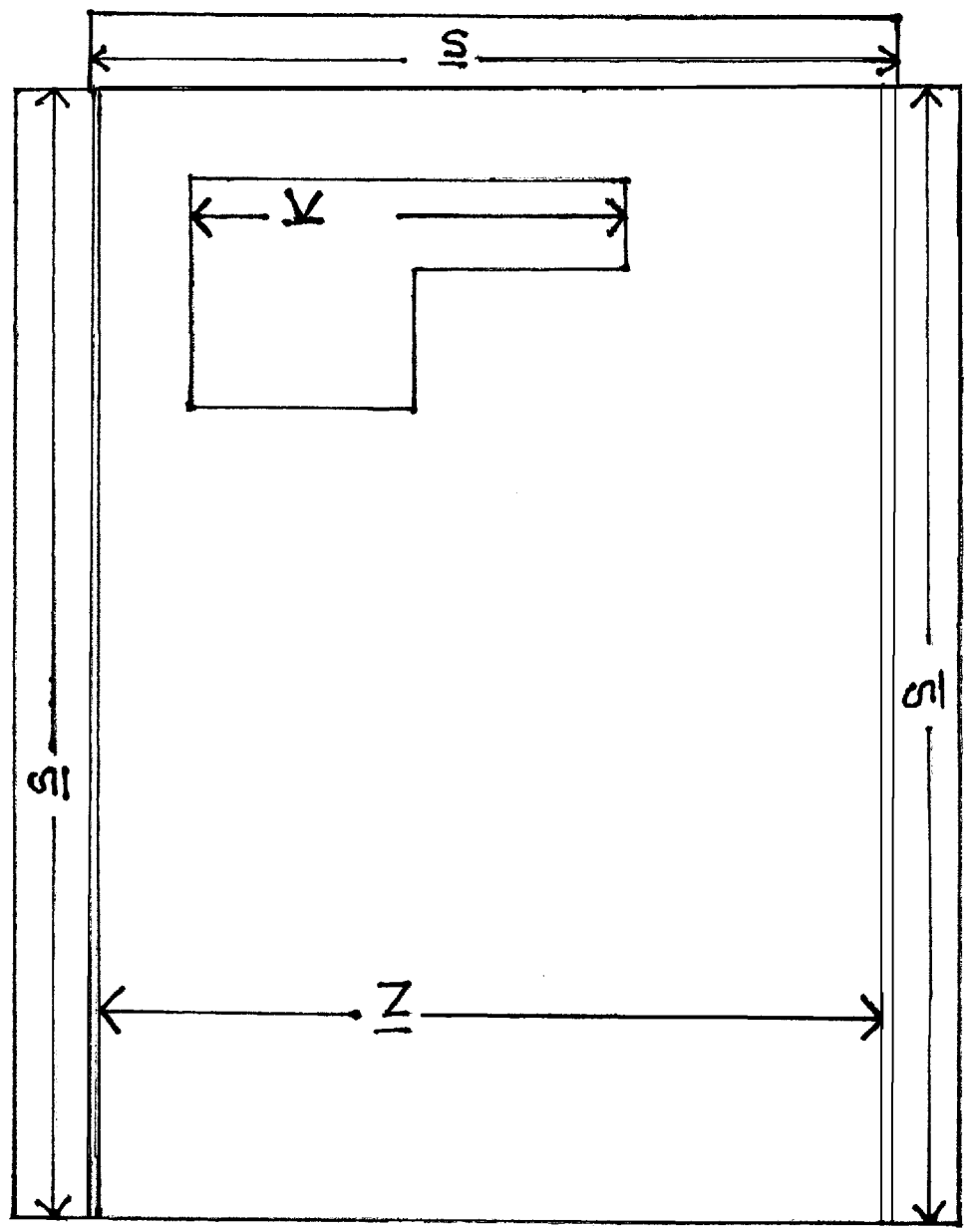
FIG. 15 is a diagram of a front panel of a cover configured to insulate an automatic teller machine.

FIG. 15 is a diagram of the front panel of one possible embodiment of the cover or jacket of the present application configured to insulate automatic teller machines. The front panel portion of the cover comprises seams S, a vent V, and zippers Z. The front panel portion of the cover is configured to insulate the side of the ATM which comprises the door facing the inside of the bank.

Figure 16:
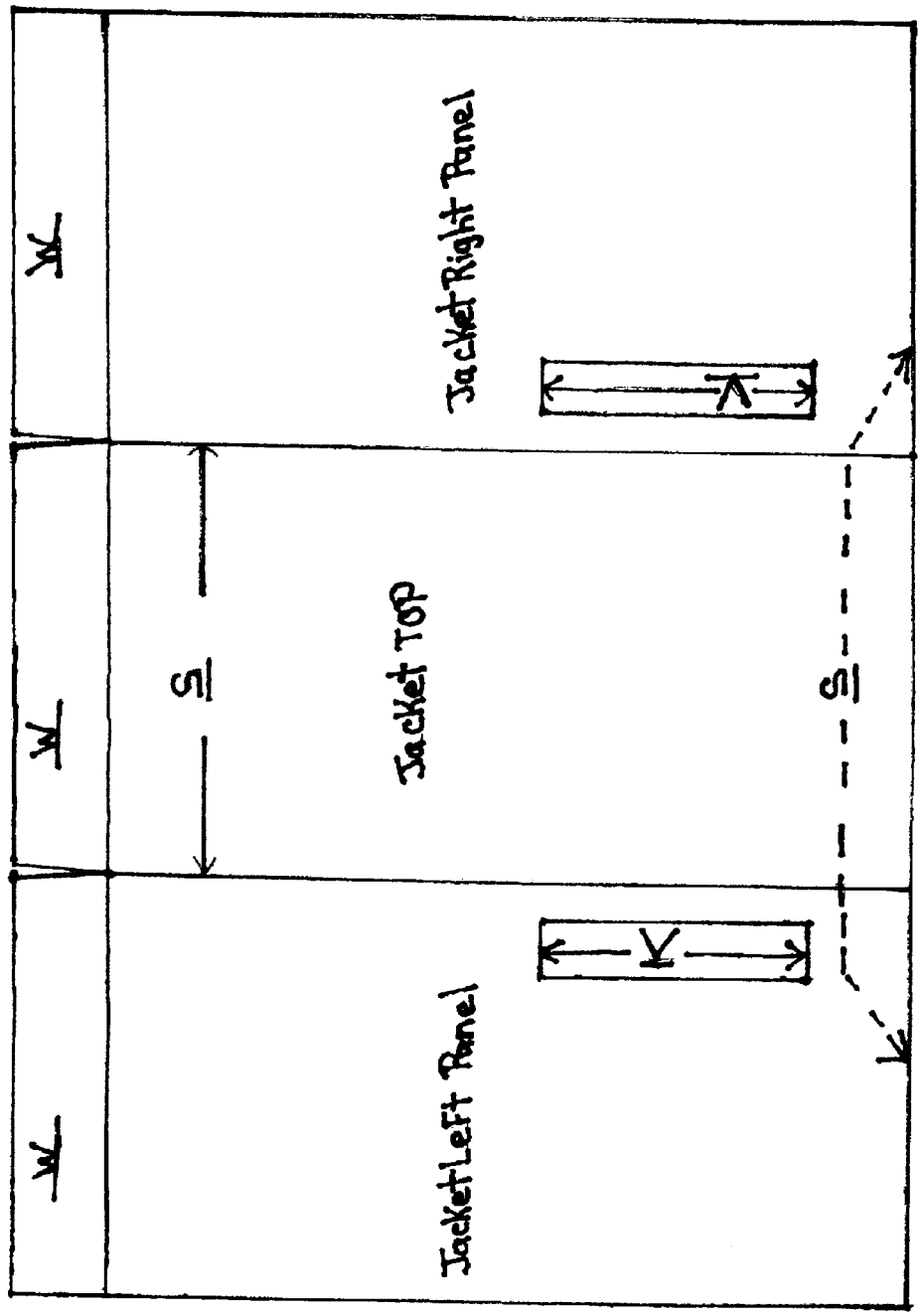
FIG. 16 is a diagram of a portion of the cover configured to insulate an automatic teller machine.

FIG. 16 is a diagram of three sides of the possible embodiment of the cover or jacket of the present application configured to insulate automatic teller machines according to FIG. 15. The three-sided portion of the cover as seen in FIG. 16 comprises hook and loop fasteners W, seams S, and vents V. The middle section of the three-sided portion is configured to insulate the top of the ATM. The two side sections of the three-sided portion abutting either side of the middle section are configured to insulate the sides of the ATM that are disposed in either side of both the top of the ATM as well as the door of the ATM facing the inside of the bank.

The three-sided portion of the cover in FIG. 16 is configured to fit together with the front panel portion as seen in FIG. 15 to essentially fully cover the ATM inside the bank. When the front panel of FIG. 15 is engaged with the three-sided portion in FIG. 16, the cover is configured to essentially fully cover the side of the ATM that faces the inside of the bank. When the front panel is disengaged from the three-sided portion, the cover is configured to permit bank personnel to access the ATM on the bank side of the ATM.

Figure 17:
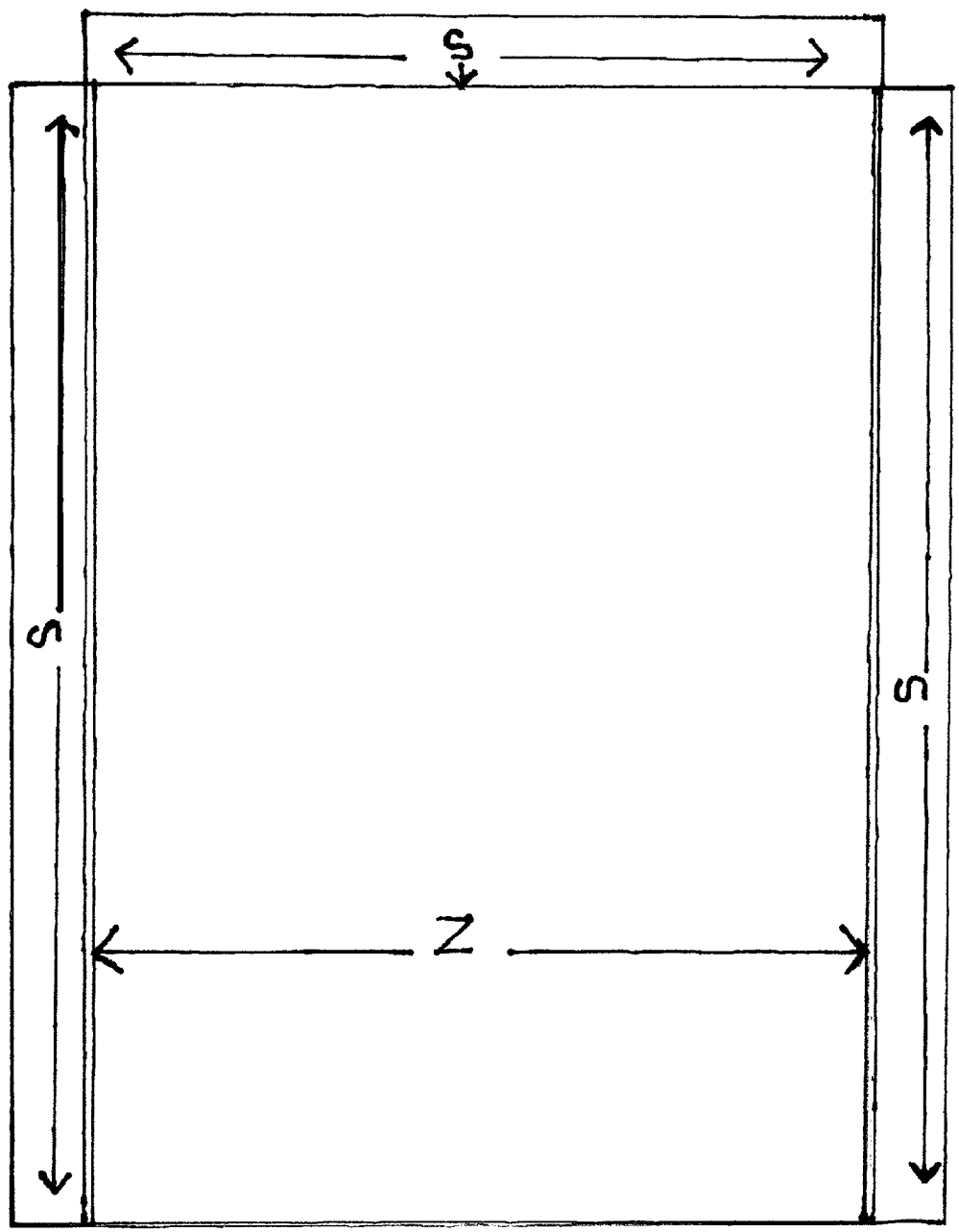
FIG. 17 is a diagram of a front panel of a cover configured to insulate a night drop vault

FIG. 17 is a diagram of the front panel of one possible embodiment of the cover or jacket of the present application configured to insulate night drop vaults. The front panel portion of the cover comprises seams S and zippers Z. The front panel portion of the cover is configured to insulate the side of the night drop vault which comprises the door facing the inside of the bank.

Figure 18:
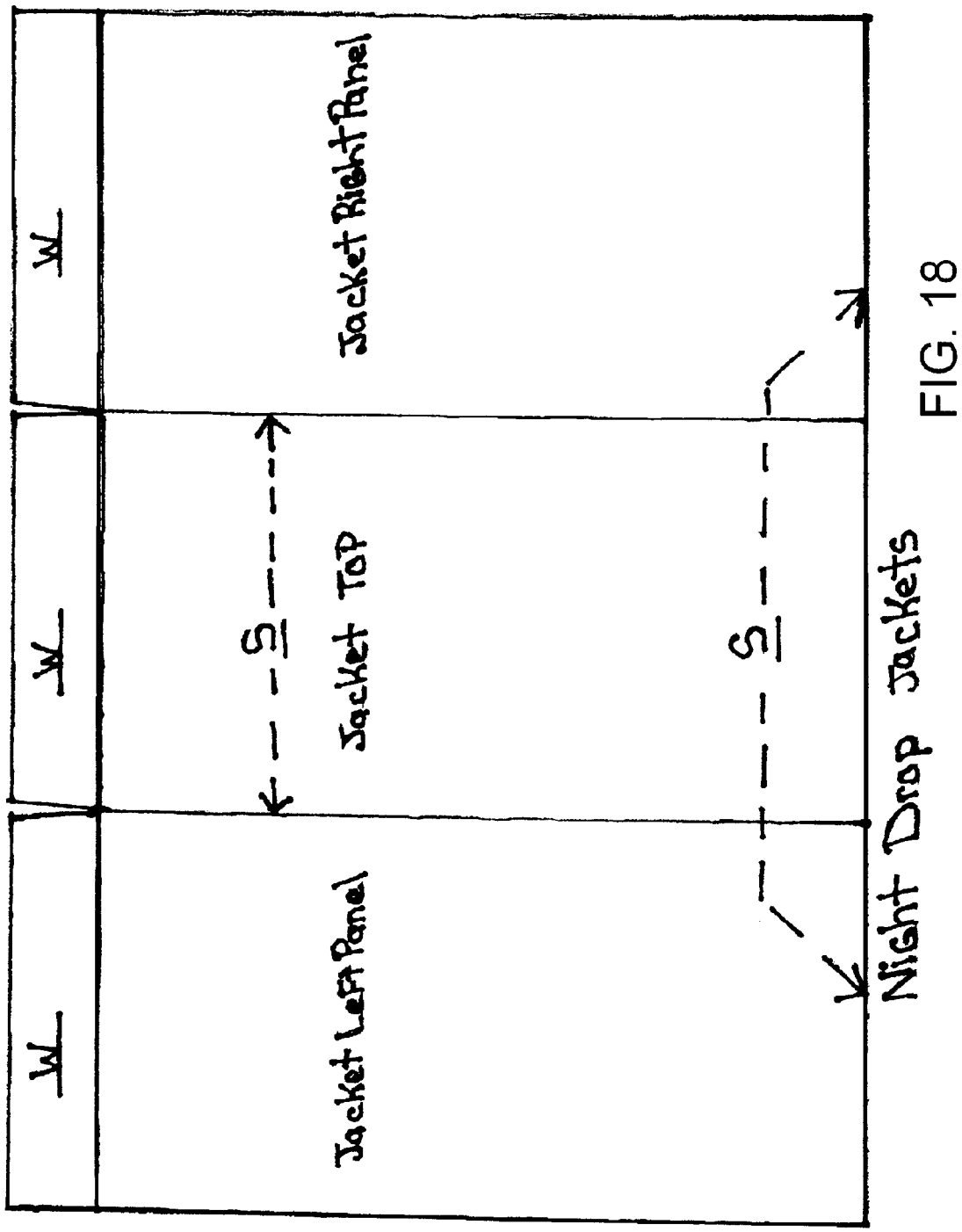
FIG. 18 is a diagram of a portion of the cover configured to insulate a night drop vault.

FIG. 18 is a diagram of three sides of the possible embodiment of the cover or jacket of the present application configured to insulate night drop vaults according to FIG. 17. The three-sided portion of the cover as seen in FIG. 18 comprises hook and loop fasteners W and seams S. The middle section of the three-sided portion is configured to insulate the top of the night drop vault. The two side sections of the three-sided portion abutting either side of the middle section are configured to insulate the sides of the night drop vault that are disposed in either side of both the top of the night drop vault as well as the door of the night drop vault facing the inside of the bank.

The three-sided portion of the cover in FIG. 18 is configured to fit together with the front panel portion as seen in FIG. 17 to essentially fully cover the night drop vault inside the bank. When the front panel of FIG. 17 is engaged with the three-sided portion in FIG. 18, the cover is configured to essentially fully cover the side of the night drop vault that faces the inside of the bank. When the front panel is disengaged from the three-sided portion, the cover is configured to permit bank personnel to access the night drop vault on the bank side of the night drop vault.

Figure 19:
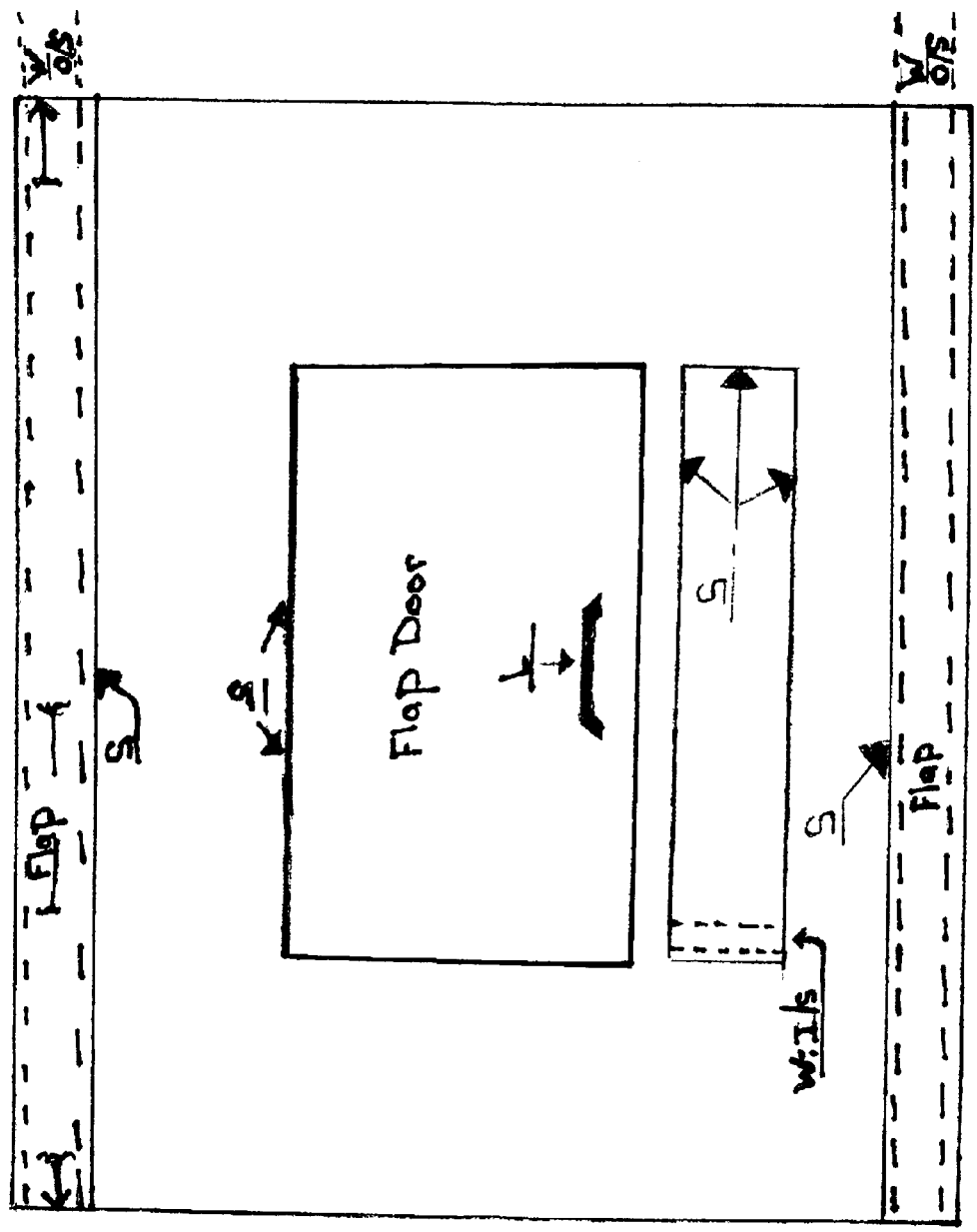
FIG. 19 is a diagram of the top portion of a cover configured to insulate a cash deal drawer.

FIG. 19 is a diagram of the top portion of a cover or jacket according to one possible embodiment of the present application, which is configured to insulate cash deal drawers. The top portion of the cover of FIG. 19 comprises flaps, a flap door, seams S, and hook and loops fasteners disposed on either the inside (I/S) or outside (O/S) of the cover. The flap door may be configured to be lifted to permit personnel to access the cash deal drawer. The flap door may be closed to essentially fully cover the cash deal drawer and therefore insulate the cash deal drawer.

Figure 20:
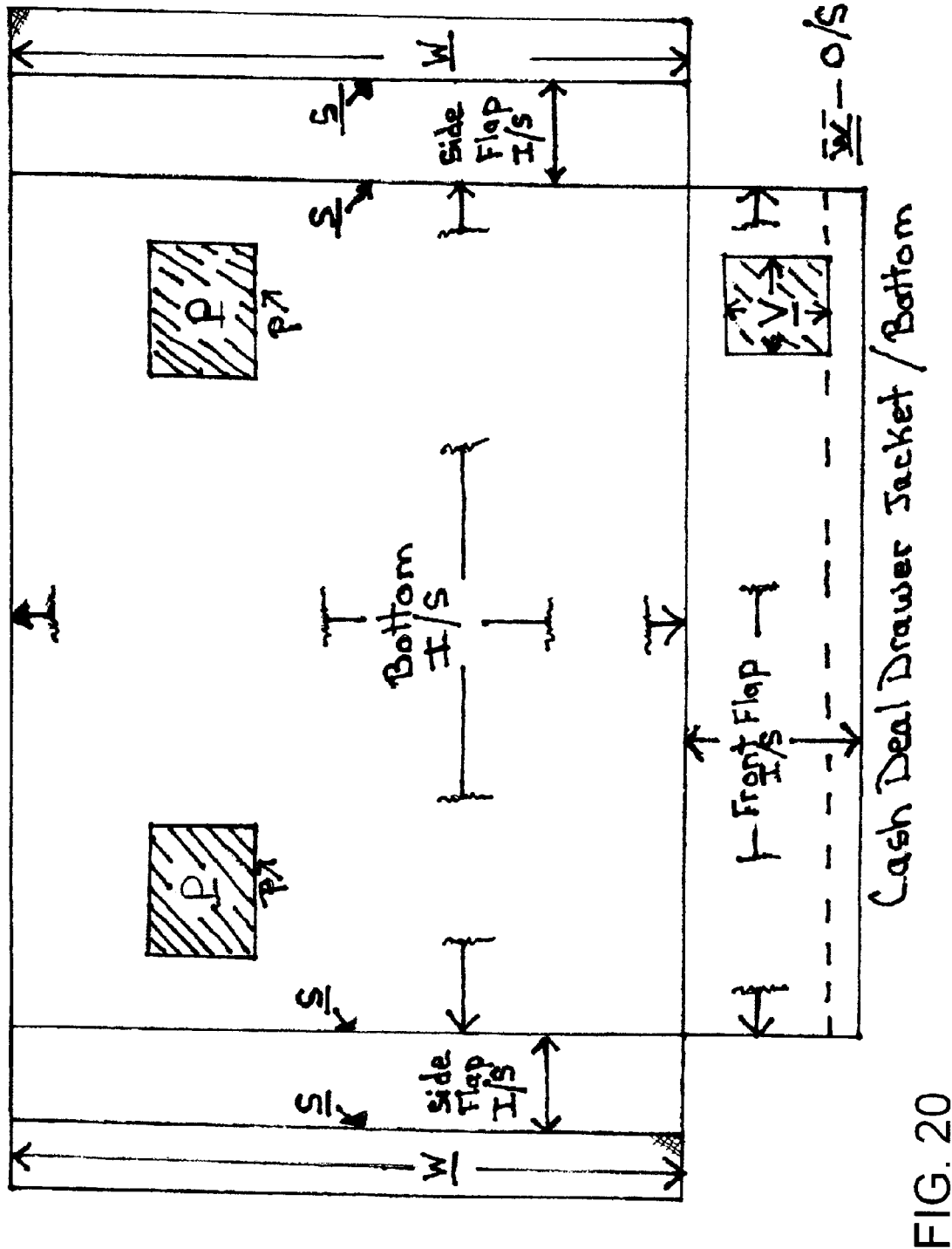
FIG. 20 is a diagram of the bottom portion of the cover configured to insulate a cash deal drawer.

FIG. 20 is a diagram of the bottom portion of the cover or jacket as shown in FIG. 19. The bottom portion of the cover as seen in FIG. 20 comprises power P, hook and loop fasteners W, seams S, and vents V, as well as side flaps and a front flap.

Some examples of insulation, which may possibly be utilized or adapted for use in at least one possible embodiment according to the present application may possibly be found in the following U.S. Pat. No. 7,985,493, having the title "HIGH TEMPERATURE INSULATION AND INSULATED ARTICLE," published on Jul. 26, 2011; U.S. Pat. No. 7,797,950, having the title "ACTIVE THERMAL INSULATION SYSTEM UTILIZING PHASE CHANGE MATERIAL AND A COOL AIR SOURCE," published on Sep. 21, 2010; U.S. Pat. No. 7,791,003, having the title "COLLAPSIBLE INSULATED FOOD DELIVERY BAG," published on Sep. 7, 2010; U.S. Pat. No. 7,762,424, having the title "FOLDABLE AIR INSULATING SLEEVE," published on Jul. 27, 2010; U.S. Pat. No. 7,555,822, having the title "LASER GENERATION OF THERMAL INSULATION BLANKET, published on Jul. 7, 2009; and U.S. Pat. No. 7,494,946, having the title "THERMAL INSULATION FOR ARTICLES OF CLOTHING," and published on Feb. 24, 2009.

Some examples of automatic teller machines, which may possibly be utilized or adapted for use in at least one possible embodiment according to the present application may possibly be found in the following U.S. Pat. No. 4,221,086, having the title "BANKING PROTECTION SYSTEM FOR 24 HOUR BANKING," published on Sep. 9, 1980; U.S. Pat. No. 4,835,983, having the title "KIOSK WITH AIR CONDITIONING," published on Jun. 6, 1989; U.S. Pat. No. 5,256,862, having the title "CASH MANAGING SYSTEM," published on Oct. 26, 1993; U.S. Pat. No. 5,010,238, having the title "AUTOMATIC CASH TRANSACTION SYSTEM AND METHOD," published on Apr. 23, 1991; U.S. Pat. No. 4,343,582, having the title "BANKNOTE DISPENSING APPARATUS," published on Aug. 10, 1982; and U.S. Pat. No. 4,282,424, having the title "AUTOMATIC CASH DISPENSING MACHINE," and published on Aug. 4, 1981.

Some examples of Automatic Teller Machines (ATMs) may include Diebold Opteva Models 326—Check Deposit and Payment Terminal, 328—Cash Recycler, 450—Full Function Lobby ATM, 500e—Lobby Cash Dispenser, 520c—Lobby Cash Dispenser, 522—Lobby Cash Dispenser, 522L—Cash Dispenser, 522—Exterior Cash Dispenser, 562—Through-the-wall, Walk-up Cash Dispenser, 562c—Through-the-wall, Walk-up cash dispenser, 562r—Through-the-wall, Walk-up cash dispenser, 562L—Through-the-wall, Walk-up cash dispenser, 720—Advanced-function Lobby ATM, 740—Advanced-function, Through-the-wall Drive-up ATM, 750—Advanced-function, Island Drive-up ATM, and 760—Advanced-function, Through-the-wall Walk-up ATM. Diebold, Incorporated is headquartered at 5995 Mayfair Road, P.O. Box 3077, North Canton, Ohio USA 44720-8077.

Some examples of night drop vaults may include SafeandVault.com Model 145 DB retail depository, Model 250 Wells, Model 125-SED, and Model 68-LD. SafeandVault.com a division of KL Security Enterprises, Inc., located at 2740 Wyndham Way, West Lafayette, Ind. 47906.

Some examples of cash deal drawers, which may possibly be utilized or adapted for use in at least one possible embodiment, may possibly be found in the following U.S. Pat. No. 6,789,860, having the title "Deal drawer apparatus," issued on Sep. 14, 2004; U.S. Pat. No. 5,802,991, having the title "Transaction drawer assembly and method," issued on Sep. 8, 1998; U.S. Pat. No. 4,640,200, having the title "Pass-through transaction drawer with removable deal tray," issued on Feb. 3, 1987; U.S. Pat. No. 4,596,358, having the title "Serving device," issued on Jun. 24, 1986; U.S. Pat. No. 4,393,789, having the title "High security transaction drawer," issued on Jul. 19, 1983; and U.S. Pat. No. 3,682,113, having the title "DEAL DRAWER," issued on Aug. 8, 1972.

One feature or aspect of an embodiment is believed at the time of the filing of this patent application to possibly reside broadly in a method of reducing drafts on personnel in a bank building and reducing cold drafts on employees, personnel and other persons in said bank building while reducing heating costs in said bank building during cold weather and reducing unpleasant heat on employees, personnel and other persons in said bank building and reducing cooling costs in said bank building during hot weather and providing a comfortable environment for employees, personnel and other persons in said bank building and improving the health of employees, personnel and other persons in said bank building by covering an automatic teller machine with a cover arrangement, said method comprising: disposing said cover arrangement comprising an insulated front portion, an insulated top portion and at least one insulated side portion about said automatic teller machine inside said bank building, with said insulated front portion being configured and disposed for covering the front of said automatic teller machine inside said bank building, said insulated top portion of said cover being configured and disposed for covering the top of said automatic teller machine, said at least one insulated side portion being configured and disposed for covering at least one side of said automatic teller machine, with said front portion comprising a window structure configured for permitting air to flow through a ventilation opening of said machine and configured for providing access visually to a portion of said front portion of said machine, with said window structure being configured and disposed for permitting the viewing of a video screen of said automatic teller machine inside said bank, said cover arrangement further comprising a fastening arrangement being configured and disposed for substantially sealing said cover arrangement about said automatic teller machine, with said insulated front portion being further configured and disposed for permitting an employee to lift said insulated front portion away from said front of said automatic teller machine inside said bank building to allow access to at least one of: a keypad, a handle on automatic teller machine, and/or a safe portion of said automatic teller machine; disposing said front portion of said insulating cover arrangement, such that, said window structure is disposed around said ventilation opening and also providing visual access to a portion of said front portion of said machine; lifting said front portion away from said front of said automatic teller machine inside said bank building to allow access to at least one of: a keypad on said front of said automatic teller machine, a handle on said front of said automatic teller machine, a safe portion on said front of said automatic teller machine, and/or other area of said front of said automatic teller machine; placing said insulated front portion of said cover arrangement on said insulated top portion of said cover arrangement on said top of said automatic teller machine in a position permitting access to said at least one of: said keypad, said handle, said safe portion, and/or said other area of said front of said automatic teller machine; accessing said at least one of: said keypad, said handle, said safe portion, and/or said other area of said front of said automatic teller machine; and placing said insulated front portion of said cover arrangement on said front of said automatic teller machine in a position covering said at least one of: said keypad, said handle, said safe portion, and/or said other area of said front of said automatic teller machine.

Another feature or aspect of an embodiment is believed at the time of the filing of this patent application to possibly reside broadly in the apparatus configured to function according to the method, wherein said cover arrangement being configured and disposed to cover an automatic teller machine inside a bank building comprises: an insulated cover arrangement being configured and disposed to cover said automatic teller machine inside said bank building; said insulated cover arrangement being further configured to reflect heat away from said automatic teller machine and back into said inside of said bank building during cold weather; said insulated cover arrangement being configured to reduce transmission of heat and cold from said automatic teller machine to said inside of said bank building; said insulated cover arrangement comprising: an insulated front portion being configured and disposed to cover the front of said automatic teller machine inside said bank building; an insulated top portion being configured and disposed to cover the top of said automatic teller machine inside said bank building; and at least one insulated side portion being configured and disposed for covering at least one side of said automatic teller machine; said insulated front portion being further configured and disposed to permit an employee to lift said insulated front portion away from said front of said automatic teller machine inside said bank building to allow access to at least one of: a keypad, a handle on automatic teller machine, a safe portion of said automatic teller machine, and/or and/or said other area of said front of said automatic teller machine; said insulated front portion of said cover arrangement further comprises a window structure configured and disposed to permit air to flow through a ventilation opening of said machine and to provide access visually to a portion of said insulated front portion of said machine; said window structure being configured and disposed to permit the viewing of a video screen of said automatic teller machine inside said bank; and said cover arrangement further comprises a fastening arrangement being configured and disposed to substantially seal said cover arrangement about said automatic teller machine.

Yet another feature or aspect of an embodiment is believed at the time of the filing of this patent application to possibly reside broadly in the apparatus configured to function according to the method, wherein said fastening arrangement comprises a zipper structure configured to zip together said front portion of said cover arrangement and said at least one side portion of said cover arrangement.

Still another feature or aspect of an embodiment is believed at the time of the filing of this patent application to possibly reside broadly in the apparatus according, wherein said fastening arrangement comprises a hook and loop fastening arrangement.

A further feature or aspect of an embodiment is believed at the time of the filing of this patent application to possibly reside broadly in the apparatus, wherein: said insulated cover arrangement comprises a fabric outer surface and an insulating material layer disposed adjacent said fabric outer surface and said insulating material layer configured to be disposed towards said automatic teller machine; and said insulated cover arrangement further comprises a reflective inner surface disposed on said insulating material layer which reflective inner surface is configured to be disposed between said insulating material layer and said automatic teller machine during use.

Another feature or aspect of an embodiment is believed at the time of the filing of this patent application to possibly reside broadly in the apparatus, wherein said cover arrangement comprises an installation fastening arrangement configured to attach said cover arrangement to at least one of: said automatic teller machine; and an area surrounding said automatic teller machine.

Yet another feature or aspect of an embodiment is believed at the time of the filing of this patent application to possibly reside broadly in the apparatus, wherein said installation fastening arrangement comprises at least one of: hook and loop tape, snaps, zippers, eyelets, screws, nails, glues, construction adhesives, channels, grommets, welding, and other types of fusion.

Still another feature or aspect of an embodiment is believed at the time of the filing of this patent application to possibly reside broadly in a method of reducing drafts on personnel in a bank building and reducing cold drafts on employees, personnel and other persons in said bank building while reducing heating costs in said bank building during cold weather and reducing unpleasant heat on employees, personnel and other persons in said bank building and reducing cooling costs in said bank building during hot weather and providing a comfortable environment for employees, personnel and other persons in said bank building and improving the health of employees, personnel and other persons in said bank building by covering a cash deal drawer machine with a cover arrangement, said method comprising: disposing said cover arrangement comprising an insulated cover portion and an insulated flap portion about said cash deal drawer machine inside said bank building, with said flap being configured and disposed for covering an inside opening of said cash deal drawer machine inside said bank building, said flap substantially solely covering said accessible inside portion of said deal drawer machine cover, with said flap comprising a tab which is configured and disposed for permitting an employee to grasp said tab and lift said flap away from said cover to allow access to said cash deal drawer inside said bank building, said cover arrangement further comprising a fastening arrangement configured and disposed for substantially sealing said flap onto said cover; moving said cash deal drawer out away from inside said bank building and toward a customer outside said bank building to allow said customer to access said cash deal drawer outside said bank building; placing documents and/or other items in cash deal drawer outside said bank building; moving said drawer in and toward said employee inside said bank building to allow said employee to access drawer; grasping said tab and lifting said flap away from said cover; moving said cover from a position covering said accessible inside portion of said cash deal drawer to a position allowing access to said accessible inside portion of said cash deal drawer inside said bank building; removing said documents and/or other items from said cash deal drawer inside said bank building; grasping said tab and lowering said flap toward said cover; moving said cover from a position allowing access to said accessible inside portion of said cash deal drawer into a position covering said accessible inside portion of said cash deal drawer inside said bank building; completing the transaction inside said bank building; grasping said tab and lifting said flap away from said cover; moving said flap from a position covering said accessible inside portion of said cash deal drawer to a position allowing access to said accessible inside portion of said cash deal drawer inside said bank building; placing documents and/or other items into said cash deal drawer inside said bank building; moving said cash deal drawer out and toward said customer outside said bank building to allow said customer to access said cash deal drawer outside said bank building; removing documents and/or other items from said cash deal drawer outside said bank building; grasping said tab and lowering said flap toward said cover inside said bank building; moving said flap from a position allowing access to said accessible inside portion of said cash deal drawer inside said bank building into a position covering said accessible inside portion of said cash deal drawer inside said bank building; and moving said drawer in toward said employee inside said bank building to allow said employee to access drawer for next transaction.

A further feature or aspect of an embodiment is believed at the time of the filing of this patent application to possibly reside broadly in the apparatus configured to function according to the method, wherein said cover arrangement being configured and disposed to cover a cash deal drawer machine inside a bank building comprises: an insulated cover portion being configured and disposed to cover an inside opening of said cash deal drawer machine inside said bank building; an insulated flap portion being configured and disposed to substantially solely cover said accessible inside portion of said deal drawer machine cover; said flap comprising a tab; said tab being configured and disposed to permit an employee to grasp said tab and lift said flap away from said cover to allow access to said cash deal drawer inside said bank building; said cover arrangement further comprises a fastening arrangement; and said fastening arrangement configured and disposed to substantially seal said flap onto said cover.

Another feature or aspect of an embodiment is believed at the time of the filing of this patent application to possibly reside broadly in the apparatus, wherein: said insulated cover portion comprises a fabric outer surface and an insulating material layer disposed adjacent said fabric outer surface and said insulating material layer configured to be disposed towards said machine; said cover comprises a reflective inner surface disposed on said insulating material layer which reflective inner surface is configured to be disposed between said insulating material layer and said machine during use; and said fastening arrangement comprises a hook a loop fastening arrangement.

Yet another feature or aspect of an embodiment is believed at the time of the filing of this patent application to possibly reside broadly in the apparatus, wherein said cover arrangement comprises at least one hole opening being configured and disposed to permit wiring and/or electrical cords to be inserted through said cover arrangement.

Still another feature or aspect of an embodiment is believed at the time of the filing of this patent application to possibly reside broadly in the apparatus, wherein: said cover arrangement comprises an insulated bottom portion being configured and disposed to cover the bottom of said cash deal drawer machine inside said bank building; said insulated bottom portion comprises at least one bottom side flap portion being configured and disposed to fit along at least one side portion of the bottom of said cash deal drawer; said insulated bottom portion further comprises a bottom front flap portion being configured and disposed to fit along a front portion of the bottom of said cash deal drawer; said insulated bottom portion comprises a bottom fastening arrangement; said bottom fastening arrangement comprises a hook and loop bottom fastening arrangement; said insulated bottom portion comprises at least one bottom hole opening being configured and disposed to permit wiring and/or electrical cords to be inserted through said insulated bottom portion; and said insulated bottom portion comprises at least one vent being configured and disposed to permit air flow on the bottom of said cash deal drawer.

A further feature or aspect of an embodiment is believed at the time of the filing of this patent application to possibly reside broadly in the apparatus, wherein: said cover arrangement comprises an installation fastening arrangement configured to attach said cover arrangement to at least one of: said cash deal drawer and an area surrounding said cash deal drawer; and said installation fastening arrangement comprises at least one of: hook and loop tape, snaps, zippers, eyelets, screws, nails, glues, construction adhesives, channels, grommets, welding, and other types of fusion.

One feature or aspect of an embodiment is believed at the time of the filing of this patent application to possibly reside broadly in a method of reducing drafts on personnel in a bank building and reducing cold drafts on employees, personnel and other persons in said bank building while reducing heating costs in said bank building during cold weather and reducing unpleasant heat on employees, personnel and other persons in said bank building and reducing cooling costs in said bank building during hot weather and providing a comfortable environment for employees, personnel and other persons in said bank building and improving the health of employees, personnel and other persons in said bank building by covering a night drop vault with a cover arrangement, said method comprising: disposing said cover arrangement comprising an insulated front portion, an insulated top portion and at least one insulated side portion about said night drop vault inside said bank building, with said insulated front portion being configured and disposed for covering the front of said night drop vault inside said bank building, said insulated top portion of said cover being configured and disposed for covering the top of said night drop vault, said at least one insulated side portion being configured and disposed for covering at least one side of said night drop vault, with said cover arrangement further comprising a fastening arrangement being configured and disposed for substantially sealing said cover arrangement about said night drop vault, with said insulated front portion being further configured and disposed for permitting an employee to lift said insulated front portion away from said front of said night drop vault inside said bank building to allow access to said night drop vault; disposing said front portion of said insulating cover arrangement, such that, said front portion of said machine is covered and not visible; lifting said front portion away from said front of said night drop vault inside said bank building to allow access said night drop vault; placing said insulated front portion of said cover arrangement on said insulated top portion of said cover arrangement on said top of said night drop vault in a position permitting access to said night drop vault; accessing said night drop vault; and placing said insulated front portion of said cover arrangement on said front of said night drop vault in a position covering said night drop vault.

Another feature or aspect of an embodiment is believed at the time of the filing of this patent application to possibly reside broadly in the apparatus configured to function according to the method, wherein said cover arrangement being configured and disposed to cover an night drop vault inside a bank building comprises: an insulated cover arrangement being configured and disposed to cover said night drop vault inside said bank building; said insulated cover arrangement being further configured to reflect heat away from said night drop vault and back into said inside of said bank building during cold weather; said insulated cover arrangement being configured to reduce transmission of heat and cold from said night drop vault to said inside of said bank building; said insulated cover arrangement comprising: an insulated front portion being configured and disposed to cover the front of said night drop vault inside said bank building; an insulated top portion being configured and disposed to cover the top of said night drop vault inside said bank building; at least one insulated side portion being configured and disposed for covering at least one side of said night drop vault; said insulated front portion being further configured and disposed to permit an employee to lift said insulated front portion away from said front of said night drop vault inside said bank building to allow access to said night drop vault; and said cover arrangement further comprises a fastening arrangement being configured and disposed to substantially seal said cover arrangement about said night drop vault.

Yet another feature or aspect of an embodiment is believed at the time of the filing of this patent application to possibly reside broadly in the apparatus configured to function according to the method, wherein said fastening arrangement comprises a zipper structure configured to zip together said front portion of said cover arrangement and said at least one side portion of said cover arrangement.

Still another feature or aspect of an embodiment is believed at the time of the filing of this patent application to possibly reside broadly in the apparatus, wherein said fastening arrangement comprises a hook and loop fastening arrangement.

A further feature or aspect of an embodiment is believed at the time of the filing of this patent application to possibly reside broadly in the apparatus, wherein: said insulated cover arrangement comprises a fabric outer surface and an insulating material layer disposed adjacent said fabric outer surface and said insulating material layer configured to be disposed towards said night drop vault; and said insulated cover arrangement further comprises a reflective inner surface disposed on said insulating material layer which reflective inner surface is configured to be disposed between said insulating material layer and said night drop vault during use.

Another feature or aspect of an embodiment is believed at the time of the filing of this patent application to possibly reside broadly in the apparatus, wherein said cover arrangement comprises an installation fastening arrangement configured to attach said cover arrangement to at least one of: said night drop vault; and an area surrounding said night drop vault.

Yet another feature or aspect of an embodiment is believed at the time of the filing of this patent application to possibly reside broadly in the apparatus, wherein said installation fastening arrangement comprises at least one of: hook and loop tape, snaps, zippers, eyelets, screws, nails, glues, construction adhesives, channels, grommets, welding and other types of fusion.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The purpose of incorporating U.S. patents, foreign patents, publications, etc. is solely to provide additional information relating to features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, are not considered to be incorporated by reference herein, or in any future continuing applications, any applications in which the present application is incorporated, and any applications which claim priority from the present application.

All of the references and documents cited in any of the documents cited herein, except for the exceptions indicated herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of reducing drafts on personnel in a bank building and reducing cold drafts on employees, personnel and other persons in said bank building while reducing heating costs in said bank building during cold weather and reducing unpleasant heat on employees, personnel and other persons in said bank building and reducing cooling costs in said bank building during hot weather and providing a comfortable environment for employees, personnel and other persons in said bank building and improving the health of employees, personnel and other persons in said bank building by covering an automatic teller machine with a cover arrangement, said method comprising:

disposing said cover arrangement comprising an insulated front portion, an insulated top portion and at least one insulated side portion about said automatic teller machine inside said bank building, with said insulated front portion being configured and disposed for covering the front of said automatic teller machine inside said bank building, said insulated top portion of said cover being configured and disposed for covering the top of said automatic teller machine, said at least one insulated side portion being configured and disposed for covering at least one side of said automatic teller machine, with said front portion comprising a window structure configured for permitting air to flow through a ventilation opening of said machine and configured for providing access visually to a portion of said front portion of said machine, with said window structure being configured and disposed for permitting the viewing of a video screen of said automatic teller machine inside said bank, said cover arrangement further comprising a fastening arrangement being configured and disposed for substantially sealing said cover arrangement about said automatic teller machine, with said insulated front portion being further configured and disposed for permitting an employee to lift said insulated front portion away from said front of said automatic teller machine inside said bank building to allow access to at least one of: a keypad, a handle on automatic teller machine, and/or a safe portion of said automatic teller machine;

disposing said front portion of said insulating cover arrangement, such that, said window structure is disposed around said ventilation opening and also providing visual access to a portion of said front portion of said machine;

lifting said front portion away from said front of said automatic teller machine inside said bank building to allow access to at least one of: a keypad on said front of said automatic teller machine, a handle on said front of said automatic teller machine, a safe portion on said front of said automatic teller machine, and/or other area of said front of said automatic teller machine;

placing said insulated front portion of said cover arrangement on said insulated top portion of said cover arrangement on said top of said automatic teller machine in a position permitting access to said at least one of: said keypad, said handle, said safe portion, and/or said other area of said front of said automatic teller machine;

accessing said at least one of: said keypad, said handle, said safe portion, and/or said other area of said front of said automatic teller machine; and placing said insulated front portion of said cover arrangement on said front of said automatic teller machine in a position covering said at least one of: said keypad, said handle, said safe portion, and/or said other area of said front of said automatic teller machine.

2. The apparatus configured to function according to the method in claim 1, wherein said cover arrangement being configured and disposed to cover an automatic teller machine inside a bank building comprises:

an insulated cover arrangement being configured and disposed to cover said automatic teller machine inside said bank building;

said insulated cover arrangement being further configured to reflect heat away from said automatic teller machine and back into said inside of said bank building during cold weather;

said insulated cover arrangement being configured to reduce transmission of heat and cold from said automatic teller machine to said inside of said bank building; said insulated cover arrangement comprising:

an insulated front portion being configured and disposed to cover the front of said automatic teller machine inside said bank building;

an insulated top portion being configured and disposed to cover the top of said automatic teller machine inside said bank building; and at least one insulated side portion being configured and disposed for covering at least one side of said automatic teller machine;

said insulated front portion being further configured and disposed to permit an employee to lift said insulated front portion away from said front of said automatic teller machine inside said bank building to allow access to at least one of: a keypad, a handle on automatic teller machine, a safe portion of said automatic teller machine, and/or and/or said other area of said front of said automatic teller machine;

said insulated front portion of said cover arrangement further comprises a window structure configured and disposed to permit air to flow through a ventilation opening of said machine and to provide access visually to a portion of said insulated front portion of said machine;

said window structure being configured and disposed to permit the viewing of a video screen of said automatic teller machine inside said bank; and said cover arrangement further comprises a fastening arrangement being configured and disposed to substantially seal said cover arrangement about said automatic teller machine.

3. The apparatus configured to function according to the method in claim 2, wherein said fastening arrangement comprises a zipper structure configured to zip together said front portion of said cover arrangement and said at least one side portion of said cover arrangement.

4. The apparatus according to claim 3, wherein said fastening arrangement comprises a hook and loop fastening arrangement.

5. The apparatus according to claim 4, wherein:

said insulated cover arrangement comprises a fabric outer surface and an insulating material layer disposed adjacent said fabric outer surface and said insulating material layer configured to be disposed towards said automatic teller machine; and said insulated cover arrangement further comprises a reflective inner surface disposed on said insulating material layer which reflective inner surface is configured to be disposed between said insulating material layer and said automatic teller machine during use.

6. The apparatus according to claim 5, wherein said cover arrangement comprises an installation fastening arrangement configured to attach said cover arrangement to at least one of:
said automatic teller machine; and
an area surrounding said automatic teller machine.

7. The apparatus according to claim 6, wherein said installation fastening arrangement comprises at least one of: hook and loop tape, snaps, zippers, eyelets, screws, nails, glues, construction adhesives, channels, grommets, welding, and other types of fusion.

8. A method of reducing drafts on personnel in a bank building and reducing cold drafts on employees, personnel and other persons in said bank building while reducing heating costs in said bank building during cold weather and reducing unpleasant heat on employees, personnel and other persons in said bank building and reducing cooling costs in said bank building during hot weather and providing a comfortable environment for employees, personnel and other persons in said bank building and improving the health of employees, personnel and other persons in said bank building by covering a cash deal drawer machine with a cover arrangement, said method comprising:

disposing said cover arrangement comprising an insulated cover portion and an insulated flap portion about said cash deal drawer machine inside said bank building, with said flap being configured and disposed for covering an inside opening of said cash deal drawer machine inside said bank building, said flap substantially solely covering said accessible inside portion of said deal drawer machine cover, with said flap comprising a tab which is configured and disposed for permitting an employee to grasp said tab and lift said flap away from said cover to allow access to said cash deal drawer inside said bank building, said cover arrangement further comprising a fastening arrangement configured and disposed for substantially sealing said flap onto said cover;

moving said cash deal drawer out away from inside said bank building and toward a customer outside said bank building to allow said customer to access said cash deal drawer outside said bank building;

placing documents and/or other items in cash deal drawer outside said bank building;

moving said drawer in and toward said employee inside said bank building to allow said employee to access drawer;

grasping said tab and lifting said flap away from said cover;

moving said cover from a position covering said accessible inside portion of said cash deal drawer to a position allowing access to said accessible inside portion of said cash deal drawer inside said bank building;

removing said documents and/or other items from said cash deal drawer inside said bank building;

grasping said tab and lowering said flap toward said cover;

moving said cover from a position allowing access to said accessible inside portion of said cash deal drawer into a position covering said accessible inside portion of said cash deal drawer inside said bank building;

completing the transaction inside said bank building;

grasping said tab and lifting said flap away from said cover;

moving said flap from a position covering said accessible inside portion of said cash deal drawer to a position allowing access to said accessible inside portion of said cash deal drawer inside said bank building;

placing documents and/or other items into said cash deal drawer inside said bank building;

moving said cash deal drawer out and toward said customer outside said bank building to allow said customer to access said cash deal drawer outside said bank building;

removing documents and/or other items from said cash deal drawer outside said bank building;

grasping said tab and lowering said flap toward said cover inside said bank building;

moving said flap from a position allowing access to said accessible inside portion of said cash deal drawer inside said bank building into a position covering said accessible inside portion of said cash deal drawer inside said bank building; and moving said drawer in toward said employee inside said bank building to allow said employee to access drawer for next transaction.

9. The apparatus configured to function according to the method in claim 8, wherein said cover arrangement being configured and disposed to cover a cash deal drawer machine inside a bank building comprises:
- an insulated cover portion being configured and disposed to cover an inside opening of said cash deal drawer machine inside said bank building;
- an insulated flap portion being configured and disposed to substantially solely cover said accessible inside portion of said deal drawer machine cover;
- said flap comprising a tab;
- said tab being configured and disposed to permit an employee to grasp said tab and lift said flap away from said cover to allow access to said cash deal drawer inside said bank building;
- said cover arrangement further comprises a fastening arrangement; and
- said fastening arrangement configured and disposed to substantially seal said flap onto said cover.

10. The apparatus according to claim 9, wherein:
- said insulated cover portion comprises a fabric outer surface and an insulating material layer disposed adjacent said fabric outer surface and said insulating material layer configured to be disposed towards said machine;
- said cover comprises a reflective inner surface disposed on said insulating material layer which reflective inner surface is configured to be disposed between said insulating material layer and said machine during use; and
- said fastening arrangement comprises a hook a loop fastening arrangement.

11. The apparatus according to claim 10, wherein said cover arrangement comprises at least one hole opening being configured and disposed to permit wiring and/or electrical cords to be inserted through said cover arrangement.

12. The apparatus according to claim 11, wherein:
- said cover arrangement comprises an insulated bottom portion being configured and disposed to cover the bottom of said cash deal drawer machine inside said bank building;
- said insulated bottom portion comprises at least one bottom side flap portion being configured and disposed to fit along at least one side portion of the bottom of said cash deal drawer;
- said insulated bottom portion further comprises a bottom front flap portion being configured and disposed to fit along a front portion of the bottom of said cash deal drawer;
- said insulated bottom portion comprises a bottom fastening arrangement;
- said bottom fastening arrangement comprises a hook and loop bottom fastening arrangement;
- said insulated bottom portion comprises at least one bottom hole opening being configured and disposed to permit wiring and/or electrical cords to be inserted through said insulated bottom portion; and
- said insulated bottom portion comprises at least one vent being configured and disposed to permit air flow on the bottom of said cash deal drawer.

13. The apparatus according to claim 12, wherein:
- said cover arrangement comprises an installation fastening arrangement configured to attach said cover arrangement to at least one of: said cash deal drawer and an area surrounding said cash deal drawer; and
- said installation fastening arrangement comprises at least one of: hook and loop tape, snaps, zippers, eyelets, screws, nails, glues, construction adhesives, channels, grommets, welding, and other types of fusion.

14. A method of reducing drafts on personnel in a bank building and reducing cold drafts on employees, personnel and other persons in said bank building while reducing heating costs in said bank building during cold weather and reducing unpleasant heat on employees, personnel and other persons in said bank building and reducing cooling costs in said bank building during hot weather and providing a comfortable environment for employees, personnel and other persons in said bank building and improving the health of employees, personnel and other persons in said bank building by covering a night drop vault with a cover arrangement, said method comprising:
- disposing said cover arrangement comprising an insulated front portion, an insulated top portion and at least one insulated side portion about said night drop vault inside said bank building, with said insulated front portion being configured and disposed for covering the front of said night drop vault inside said bank building, said insulated top portion of said cover being configured and disposed for covering the top of said night drop vault, said at least one insulated side portion being configured and disposed for covering at least one side of said night drop vault, with said cover arrangement further comprising a fastening arrangement being configured and disposed for substantially sealing said cover arrangement about said night drop vault, with said insulated front portion being further configured and disposed for permitting an employee to lift said insulated front portion away from said front of said night drop vault inside said bank building to allow access to said night drop vault;
- disposing said front portion of said insulating cover arrangement, such that, said front portion of said machine is covered and not visible;
- lifting said front portion away from said front of said night drop vault inside said bank building to allow access said night drop vault;
- placing said insulated front portion of said cover arrangement on said insulated top portion of said cover arrangement on said top of said night drop vault in a position permitting access to said night drop vault;
- accessing said night drop vault; and
- placing said insulated front portion of said cover arrangement on said front of said night drop vault in a position covering said night drop vault.

15. The apparatus configured to function according to the method in claim 14, wherein said cover arrangement being configured and disposed to cover an night drop vault inside a bank building comprises:
- an insulated cover arrangement being configured and disposed to cover said night drop vault inside said bank building;
- said insulated cover arrangement being further configured to reflect heat away from said night drop vault and back into said inside of said bank building during cold weather;
- said insulated cover arrangement being configured to reduce transmission of heat and cold from said night drop vault to said inside of said bank building;
- said insulated cover arrangement comprising:
  - an insulated front portion being configured and disposed to cover the front of said night drop vault inside said bank building;
  - an insulated top portion being configured and disposed to cover the top of said night drop vault inside said bank building;
  - at least one insulated side portion being configured and disposed for covering at least one side of said night drop vault;

said insulated front portion being further configured and disposed to permit an employee to lift said insulated front portion away from said front of said night drop vault inside said bank building to allow access to said night drop vault; and said cover arrangement further comprises a fastening arrangement being configured and disposed to substantially seal said cover arrangement about said night drop vault.

16. The apparatus configured to function according to the method in claim 15, wherein said fastening arrangement comprises a zipper structure configured to zip together said front portion of said cover arrangement and said at least one side portion of said cover arrangement.

17. The apparatus according to claim 16, wherein said fastening arrangement comprises a hook and loop fastening arrangement.

18. The apparatus according to claim 17, wherein:

said insulated cover arrangement comprises a fabric outer surface and an insulating material layer disposed adjacent said fabric outer surface and said insulating material layer configured to be disposed towards said night drop vault; and said insulated cover arrangement further comprises a reflective inner surface disposed on said insulating material layer which reflective inner surface is configured to be disposed between said insulating material layer and said night drop vault during use.

19. The apparatus according to claim 18, wherein said cover arrangement comprises an installation fastening arrangement configured to attach said cover arrangement to at least one of:

said night drop vault; and an area surrounding said night drop vault.

20. The apparatus according to claim 19, wherein said installation fastening arrangement comprises at least one of: hook and loop tape, snaps, zippers, eyelets, screws, nails, glues, construction adhesives, channels, grommets, welding and other types of fusion.

* * * * *